(12) United States Patent
Clingenpeel et al.

(10) Patent No.: US 7,661,036 B1
(45) Date of Patent: Feb. 9, 2010

(54) CACHE FOR COLLECTING EVENTS ON A MONITORED COMPUTER

(75) Inventors: James E. Clingenpeel, Salt Lake City, UT (US); Andy V. Lawrence, Alpine, UT (US); David I. Marsh, Orem, UT (US)

(73) Assignee: Oakley Networks, Salt Lake City, UT (US)

( * ) Notice: Subject to any disclaimer, the term of this patent is extended or adjusted under 35 U.S.C. 154(b) by 437 days.

(21) Appl. No.: 11/557,025

(22) Filed: Nov. 6, 2006

Related U.S. Application Data

(60) Provisional application No. 60/734,887, filed on Nov. 8, 2005.

(51) Int. Cl.
*G06F 11/00* (2006.01)
(52) U.S. Cl. .......................................... 714/47; 714/37
(58) Field of Classification Search .................. 714/37, 714/39, 47; 702/187; 709/224
See application file for complete search history.

(56) References Cited

U.S. PATENT DOCUMENTS

| | | | |
|---|---|---|---|
| 6,529,954 B1 * | 3/2003 | Cookmeyer et al. | 709/224 |
| 7,418,733 B2 * | 8/2008 | Connary et al. | 726/25 |
| 2003/0074440 A1 * | 4/2003 | Grabarnik et al. | 709/224 |
| 2006/0085691 A1 * | 4/2006 | Rivera et al. | 714/39 |
| 2006/0271827 A1 * | 11/2006 | Cascaval et al. | 714/39 |

\* cited by examiner

*Primary Examiner*—Marc Duncan
(74) *Attorney, Agent, or Firm*—Baker Botts L.L.P.

(57) ABSTRACT

Embodiments of the invention provide methods, systems, software and data structures for monitoring, analyzing, storing and/or collecting events on a monitored computer. In a set of embodiments, a monitoring process monitors one or more applications for events occurring in those application. The monitoring process, in some cases, runs in common a thread of execution with one or more of the applications. If the monitoring process detects an event, it might notify an event capture process, which might capture the event. In some embodiments, an analysis process might determine whether the event should be collected, and if so, maintain a representation of the event (perhaps in a specialized data structure). In other embodiments, a data management process is configured to store information about one or more events in an event cache, which might comprise a plurality of file streams and/or metafile streams, enabling efficient storage of information about events.

37 Claims, 11 Drawing Sheets

CACHE FOR COLLECTING EVENTS ON A MONITORED COMPUTER

CROSS-REFERENCE TO RELATED APPLICATIONS

The present disclosure may be related to the following commonly assigned applications/patents:

This application claims priority from commonly-assigned provisional U.S. Patent Application No. 60/734,887, entitled "Cache for Collecting Events on a Monitored Computer," and filed Nov. 8, 2005 by Clingenpeel et al.

This application is related to commonly-assigned U.S. patent application Ser. No. 11/556,942, entitled "Event Monitoring and Collection," and filed on a date even herewith by Clingenpeel et al., which claims priority from provisional U.S. Patent Application No. 60/734,886, entitled "Event Monitoring and Collection," and filed Nov. 8, 2005 by Clingenpeel et al.

This application is related to commonly-assigned U.S. patent application Ser. No. 11/156,968, entitled "Replaying Events Collected from a Client Computer," and filed on a date even herewith by Henry, which claims priority from provisional U.S. Patent Application No. 60/734,811, entitled "Replaying Events Collected from a Client Computer," and filed Nov. 8, 2005 by Henry.

This application is related to commonly-assigned U.S. patent application Ser. No. 11/557,007, entitled "Keyword Obfuscation," and filed on a date even herewith by Henry et al., which claims priority from provisional U.S. Patent Application No. 60/734,909, entitled "Keyword Obfuscation," and filed Nov. 8, 2005 by Henry et al.

This application is related to commonly-assigned U.S. patent application Ser. No. 11/556,984, entitled "Validation of Social Security Numbers," and filed on a date even herewith by Rogers, which claims priority from provisional U.S. Patent Application No. 60/734,812, entitled "Validation of Social Security Numbers," and filed Nov. 8, 2005 by Rogers.

This application is related to commonly-assigned U.S. patent application Ser. No. 11/557,047, entitled "Monitoring and Collection of Audio Events," and filed on a date even herewith by Neath et al., which claims priority from provisional U.S. Patent Application No. 60/734,911, entitled "Monitoring and Collection of Audio Events," and filed Nov. 8, 2005 by Neath et al.

The respective disclosures of these applications/patents are incorporated herein by reference in their entirety for all purposes.

FIELD OF THE INVENTION

The present invention relates to computer systems in general and, more particularly, to systems and methods for monitoring, collecting and/or storing events on a computer system.

BACKGROUND OF THE INVENTION

In most modern organizations, almost all important information is stored in electronic form, across a variety of computer networks, servers, and other information systems. Trusted users inside an organization often have access to confidential and protected information. Consequently, organizations often employ a variety of security mechanisms to prevent unauthorized access to and/or use of such information.

One such security mechanism is the monitoring of computers within the organization's network and/or used by the organization's employees. Several systems and methods for monitoring events on a client computer are described in detail in U.S. patent application Ser. No. 11/556,942, already incorporated by reference.

A problem that commonly arises in the monitoring of computers, however, is that by the time a monitored event is analyzed and determined to be of interest, other events prior to the event of interest already have occurred. Consider, for example, the case in which a user sends an encrypted file via electronic mail. That event is determined to be of interest and is collected. Because the file is encrypted, however, it may be difficult and/or impossible to open and/or read the file, even if it is collected as part of the collection of the event. Hence, it would be useful if a monitoring system were able to look back in time in order to collect past events that might be related to a present event of interest.

Additionally, it would be useful for a monitoring system to have a set of data structures (in memory and/or on disk) that would provide for efficient storage of representations of events.

BRIEF SUMMARY OF THE INVENTION

Embodiments of the invention provide novel methods, systems, software and data structures for monitoring, analyzing, storing and/or collecting events on a monitored computer. In a set of embodiments, a monitoring process monitors one or more applications for events occurring in those application. The monitoring process, in some cases, runs in common a thread of execution with one or more of the applications. If the monitoring process detects an event, it might notify an event capture process, which might capture the event. In some embodiments, an analysis process might determine whether the event should be collected, and if so, maintain a representation of the event (perhaps in a specialized data structure). In other embodiments, a data management process is configured to store information about one or more events in an event cache, which might comprise a plurality of file streams and/or metafile streams, enabling efficient storage of information about events.

Certain embodiments provide for advanced data-handling capabilities. Merely by way of example, in a set of embodiments, an object model may provide for the efficient storage of event objects and/or their associated data. Similarly, a stream-based file system can provide improved disk access performance, allowing embodiments to reduce overhead imposed on the monitored client.

In one aspect of certain embodiments, a monitoring agent can provide more robust collection functionality than traditional monitoring systems. Merely by way of example, in a set of embodiments, a monitoring agent may store representations monitored events (and, in some cases, data associated with such representations) in an event cache, even, in some cases, before events have been analyzed or scored. This can allow the monitoring agent to collect prologue events, which may be related to the event of interest but which occurred prior in time to the event of interest. Hence, embodiments of the invention can provide the ability to capture events that, in the past, would have gone unnoticed.

In another aspect, the event cache provided by certain embodiments can allow for the collection of events even when the monitored computer lacks connectivity with a monitoring server. Hence, events may be monitored even when the monitored computer is offline, such as in the case of a mobile computer, which may often be used in locations without network connectivity.

One set of embodiments provides methods of monitoring, analyzing, storing and/or collecting events. Merely by way of example, a method of caching events on a monitored computer, in accordance with some embodiments, comprises capturing a plurality of events of interest (which might include, for example, a first event of interest and a second event of interest). In some cases, the method further comprises storing information about the first and/or second events of interest in an event cache, perhaps on a non-volatile storage medium.

In a particular set of embodiments, the event cache comprise an event file stream, which comprises a representation of the first event and/or a representation of the second event. The event cache might further comprise an event context file stream, which comprises information about a context of the first event and/or information about a context of a second event. Additionally and/or alternatively, the event cache might comprise an event score file stream comprising information about a score assigned to the first event of interest and/or information about a score assigned to the second event of interest. In some cases, the event cache further comprises a session file stream, which might comprise information about a session in which the first event and/or the second event occurred.

Another exemplary method in accordance with some embodiments can be used to store representations of monitored events on a monitored computer. The exemplary method comprises, in some instances, a defining a structure for storing representations of events and/or monitoring a plurality of events occurring on the monitored computer. The exemplary method might further comprise capturing a first event of interest and/or a second event of interest. In some cases, it may be determined that the first and/or second events of interest should be collected for further analysis. Hence, representation(s) of the first and/or second events may be maintained, e.g., in a data structure defined by the data structure definition In some cases, the method further comprises storing information about the first and second events of interest in an event cache on the non-volatile storage medium.

Another set of embodiments provides systems, including without limitation systems that perform methods of the invention. An exemplary system comprises a data structure definition, which defines a structure for storing representations of events, one or more event monitor processes, one or more event capture processes, one or more event analysis processes, and/or one or more data management processes.

In certain embodiments, a data structure definition might comprise a session container definition defining a session container configured to hold a plurality of event collections. The session container therefore may define a session context for one or more event collections stored therein. The data structure definition might further comprise a collection container definition, which defines a collection container configured to hold a plurality of event objects; in some cases, the collection container defines a collection context for one or more event objects stored therein. The data structure definition, in some cases, includes an event object definition, which is configured to hold a representation of an event occurring on the monitored computer. In some cases, the event object is stored in a collection container.

Optionally, there may also be an event context object definition, which defines an event context object configured to hold information about a context of an event object and/or an event score object definition, which defines an event score object configured to hold a score of an event. In some cases, wherein an event context object and/or an event score object is stored in a collection container and/or is associated with an event object.

In some embodiments, a first event monitor process runs in a thread of execution used by a first user application; the first event monitor process may be configured to monitor one or more events occurring in the first user application and/or to notify an event capture process of the existence of a first event of interest occurring in the first user application. Similarly, a second event monitor process might run in a thread of execution used by a second user application and/or might be configured to monitor one or more events occurring in the second user application and/or to notify an event capture process of the existence of a second event of interest occurring in the second user application.

In other embodiments, an event capture process might be configured to receive one or more notifications from one or more event monitor processes. The notifications might be about one or more events of interest. The event capture process may also be configured to capture the event(s) of interest, along with, in some cases, information about a context of each of the event(s) of interest. In some cases, the event capture process may run in a thread of execution separate from the event monitor process(es).

An event analysis process might be configured to analyze one or more events of interest and/or assign one or more scores to the event(s) of interest. (In some cases, the event analysis process runs in a thread of execution separate from the thread of execution used by the event capture process.) The score(s) may be based on the analysis of the event(s) of interest. Based, perhaps, on the score(s), the event analysis process might also determine whether any of the event(s) should be collected (for further analysis, replay, etc.). In some cases, the event analysis process is configured to maintain (perhaps in a data structure defined by the data structure definition described above, and/or any other appropriate data structure), information about the context of the event(s), information about score(s) assigned to the event(s), and/or representation(s) of the event(s) themselves.

A data management process in accordance with some embodiments might be configured to store information about one or more events of interest (perhaps in an event cache, which might, in some cases, reside on a non-volatile storage medium, such as a hard drive, a database, etc.). The event cache comprises, in a set of embodiments, a plurality of file streams, including without limitation one or more of the following: an event file stream and/or an event metafile stream, an event context file stream and/or an event context file stream, an event score file stream and/or an event score metafile stream, an end-of-collection file stream and/or a session file stream.

Merely by way of example, an event file stream might comprise an event file header and/or a plurality of event data segments (which might, in some cases be variable-length data segments). Again, merely by way of example, a first event data segment might comprise a representation of a first event of interest, while a second event data segment might comprise a representation of a second event of interest.

An event metafile stream, then, might comprise an event metafile header (which might comprise a stream identifier for an event file stream, such as that described above) and/or a plurality of references to the event file stream. In a set of embodiments, these references might be fixed-length references. For instance, in some cases, a first reference might refer to the event file stream and/or might comprise a data segment identifier identifying an event data segment, as described above, while a second reference might refer again to the event file stream and/or might comprise a data segment identifier identifying a second event data segment. The data segment identifiers might comprise character offset values associated with the data segments to which they refer. Alternatively and/or additionally, the references might comprise values of the length of the data segments to which they refer.

Similarly, in some cases, an event context stream might comprise an event context file header and/or one or more event context data segments (which may, in an embodiment, be variable-length data segments). An event context data segment, for example, might comprise information about the context of an event (of which a representation might be stored in an event data segment, as noted above). An event context metafile stream, then, might comprise an event context metafile header (which might comprise a stream identifier for an event context file stream and/or one or more references (which might be fixed-length references) to the event context file stream. Such a reference might refer to the event context file stream and/or comprise an identifier identifying an event context data segment. The data segment identifiers might comprise character offset values associated with the data segments to which they refer. Alternatively and/or additionally, the references might comprise values of the length of the data segments to which they refer.

An event score file stream, then, might comprise an event score file header and/or one or more event score data segments (which may, in an embodiment, be variable-length data segments). An event score data segment, for example, might comprise information about the score assigned to an event (of which a representation might be stored in an event data segment, as noted above). An event score metafile stream, then, might comprise an event context score header (which might comprise a stream identifier for an event score file stream) and/or one or more references (which might be fixed-length references) to the event score file stream. Such a reference might refer to the event score file stream and/or comprise an identifier identifying an event score data segment. The data segment identifiers might comprise character offset values associated with the data segments to which they refer. Alternatively and/or additionally, the references might comprise values of the length of the data segments to which they refer.

An end-of-collection file stream comprises, in some embodiments, an end-of-collection header, which might indicate the end of a collection of collected events. A session file stream might comprise a session header and/or one or more collection containers. The session header might comprise a session start stream identifier (which might identify the beginning of a session) and/or a session end identifier (which might identify the end of a session). The collection container(s) each might comprise a reference to an event metafile stream (which, as noted above, can be used, for example, to identify and/or refer to an event file stream storing events in the collection), a reference to an event context metafile stream (which, as noted above, might be used to identify and/or refer to an event context file stream storing a context for one or more of the events in the collection), a reference to an event score metafile stream (which, as noted above, might be used to identify and/or refer to an event score file stream storing scores assigned to one or more events in the collection), and/or an end-of-collection file stream (which, as noted above, can signal the end of a collection of events).

Another exemplary system, which can be used to store representations of monitored events (e.g., on a monitored computer), in accordance with some embodiments, comprises a storage medium (which might be a non-volatile storage medium, such as a hard drive and/or array, database, etc.), a processor in communication with the storage medium and a set of instructions executable by the processor. The set of instructions may comprise a data structure definition, one or more event monitor processes, an event capture process, an event analysis process, and/or a data management process.

The event capture process may be configured to receive a notification from a first event monitor process about a first event of interest, capture the first event of interest for analysis by an event analysis process and/or capture information about a context of the first event of interest. In some cases, the event capture process may also be configured to receive a notification (e.g., from the first event monitor process or from a second event monitor process) about a second event of interest, capture the second event of interest for analysis by an event analysis process and/or capture information about a context of the second event of interest.

The event analysis process may be configured to determine that the first and/or second events of interest should be collected (for further analysis, replay, etc.), and/or maintain (e.g., in a data structure defined by the data structure definition) a copy of the first and/or second events of interest. The data management process may be configured to store information about the first and/or second events of interest, perhaps in an event cache on the non-volatile storage medium.

Yet another exemplary system in accordance with further embodiments may be used for caching events occurring on a monitored computer. The exemplary system might comprise an event capture process configured to capture a plurality of events of interest (which might comprise a first event of interest and/or a second event of interest). In some cases, the first event occurs in a first application, while the second event occurs in a second application. In other cases, both events might occur in the same application. In a specific set of embodiments, the first application runs in a first thread of execution, wherein the application runs in a second thread of execution, and wherein the event capture process runs in a third thread of execution separate from the first and second threads of execution.

Any of a variety of events might be captured by the event capture process. To name but a few, events captured according to embodiments of the invention might include (without limitation) a use of an encrypted protocol, a use of encrypted content, a transmission of an electronic mail message, a receipt of an electronic mail message, an attachment of a file to an electronic mail message, an attachment of an encrypted file to an electronic mail message, a load of an HTML page in a web browser, an unload of an HTML page in a web browser, a web browser request for a URL, a load of an image in a web browser, a load of a script in a web browser, a file download, an HTML form reset, an HTML form submit, an HTML form text field input, an HTML form personal information file input, an HTML radio button selected, an HTML check box selected, an HTML check box unselected, a selection from an HTML selection list, a transmission of an instant messenger message, a receipt of an instant messenger message, a creation of a file by an office application, a read of a file by an office application, a write to a file by an office application, a creation of a print job, a copy of data to a clipboard, an entry of one or more keystrokes by a user, an input from a mouse attached to the monitored computer, a movement of a cursor over an HTML elements on a display, a drive mount operation, a drive dismount operation, an unsuccessful attempt to mount a drive, a file create operation, a file copy operation, a file move operation, a file delete operation, a file read operation, a file rename operation, a file write operation, and data satisfying one or more configured regular expressions.

The exemplary system might further comprise a data management process configured to store information about the events of interest, perhaps in an event cache (which might reside, merely by way of example, on a non-volatile storage medium). The event cache comprises, in some embodiments, an event file stream comprising a representation of the first event and/or a representation of the second event, an event context file stream comprising information about a context of the first event and/or information about a context of the second event, an event score file stream comprising information about the score assigned to the first event of interest and/or information about the score assigned to the second event of interest.

In a particular set of embodiments, the representation of the first event and/or the representation of the second event might comprise one or more variable-length data segments. In other embodiments, the information about the context of the first event and/or the second event might comprise one or more variable-length data segments. In further embodiments, the information about the scores assigned to the first event and/or the second event might comprise one or more variable-length data segments.

In some embodiments, the event cache further comprises an end-of-collection file stream identifying the end of a collection comprising the first event of interest and the second event of interest. In other embodiments, the event cache further comprises a session file stream comprising information about a session in which the events occurred. In a particular set of embodiments, the event file stream might comprise a collection container.

In other embodiments, the event cache further comprises an event metafile stream comprising a reference to the representation of the first event and a reference to the representation of the second event, each of which might be a fixed-length data segment. The reference to the representation of the first event might comprise a first character offset into the event file stream; the first character offset might represent a start position of the representation of the first event. Similarly, the reference to the representation of the second event might comprise a second character offset into the event file stream; the second character offset might represent a start position of the representation of the second event. In particular embodiments, the reference to the representation of the first event further comprises a value of a length of the representation of the first event, and/or the reference to the representation of the second event further comprises a value of a length of the representation of the second event.

In accordance with certain embodiments, the event cache comprises an event context metafile stream comprising a reference to the information about the context of the first event and a reference to the information about the context of the second event; each reference might be a fixed-length data segment. In some cases, the reference to the information about the context of the first event comprises a first character offset into the event context file stream; the first character offset representing a start position of the information about the context of the first event. Likewise, the reference to the information about the context of the second event might comprise a second character offset into the event context file stream; the second character offset might also represent a start position of the information about the context of the second event. In particular embodiments, the reference to the information about the context of the first event further comprises a value of a length of the information about the context of the first event, and/or the reference to the information about the context of the second event further comprises a value of a length of the of the information about the context of the second event.

In yet another set of embodiments, the event cache comprises an event score metafile stream comprising a reference to the information about the score assigned to the first event of interest and a reference to the information about the score assigned to the second event of interest. (These references might be fixed-length data segments.) The reference to the information about the score of the first event might comprise a first character offset into the event score file stream; the first character offset might represent a start position of the information about the score of the first event. The reference to the information about the score of the second event might comprise a second character offset into the event score file stream; the second character offset might represent a start position of the information about the score of the second event. In particular embodiments, the reference to the information about the score assigned to the first event further comprises a value of a length of the information about the score assigned to the first event and/or the reference to the information about the score assigned to the second event further comprises a value of a length of the of the information about the score assigned to the second event.

In some cases, the collection container comprises a reference to one or more of the metafile streams. In other cases, the event metafile stream might comprise a stream identifier for the event file stream, the event context metafile stream might comprise a stream identifier for the event context file stream, and/or the event score metafile stream might comprise a stream identifier for the event score file stream.

Yet another set of embodiments comprises computer software programs, including without limitation programs that implement methods of the invention and/or are operable on systems of the invention. To name but one example, a computer program in accordance with some embodiments comprises a set of instructions executable by a computer. The set of instructions might include instructions to execute an event capture process configured to capture a plurality of events of interest comprising a first event of interest and a second event of interest. The set of instructions might include further instructions to execute a data management process configured to store information about the first and second events of interest in an event cache, including without limitation any of the event caches described above.

In some cases, the computer software program is configured to operate on the monitored computer. In other cases, the computer software program is configured to operate without detection by a user of the monitored computer.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Embodiments of the invention provide methods, systems, software and data structures for monitoring, analyzing, storing and/or collecting events on a monitored computer. In a set of embodiments, a monitoring process monitors one or more applications for events occurring in those application. The monitoring process, in some cases, runs in common a thread of execution with one or more of the applications. If the monitoring process detects an event, it might notify an event capture process, which might capture the event. In some embodiments, an analysis process might determine whether the event should be collected, and if so, maintain a representation of the event (perhaps in a specialized data structure). In other embodiments, a data management process is configured to store information about one or more events in an event cache, which might comprise a plurality of file streams and/or metafile streams, enabling efficient storage of information about events.

Certain embodiments provide for advanced data-handling capabilities. Merely by way of example, in a set of embodiments, an object model may provide for the efficient storage of event objects and/or their associated data. Similarly, a stream-based file system can provide improved disk access performance, allowing embodiments to reduce overhead imposed on the monitored client.

In one aspect of certain embodiments, a monitoring agent can provide more robust collection functionality than traditional monitoring systems. Merely by way of example, in a set of embodiments, a monitoring agent may store representations monitored events (and, in some cases, data associated with such representations) in an event cache, even, in some cases, before events have been analyzed or scored. This can allow the monitoring agent to collect prologue events, which may be related to the event of interest but which occurred prior in time to the event of interest. Hence, embodiments of the invention can provide the ability to capture events that, in the past, would have gone unnoticed.

In another aspect, the event cache provided by certain embodiments can allow for the collection of events even when the monitored computer lacks connectivity with a monitoring server. Hence, events may be monitored even when the monitored computer is offline, such as in the case of a mobile computer, which may often be used in locations without network connectivity.

In a set of embodiments, then a monitoring agent is configured to save events of interest (and/or representations thereof) to a cache. In this way, the monitoring agent can retrieve from the cache representations of events that already have occurred, perhaps in response to the detection of an event that triggers interest in past events, which may be related. Merely by way of example, U.S. patent application Ser. No. 11/556,942, already incorporated by reference, describes examples of how such a cache may be used to collect "prologue" events.

Figure 1A:
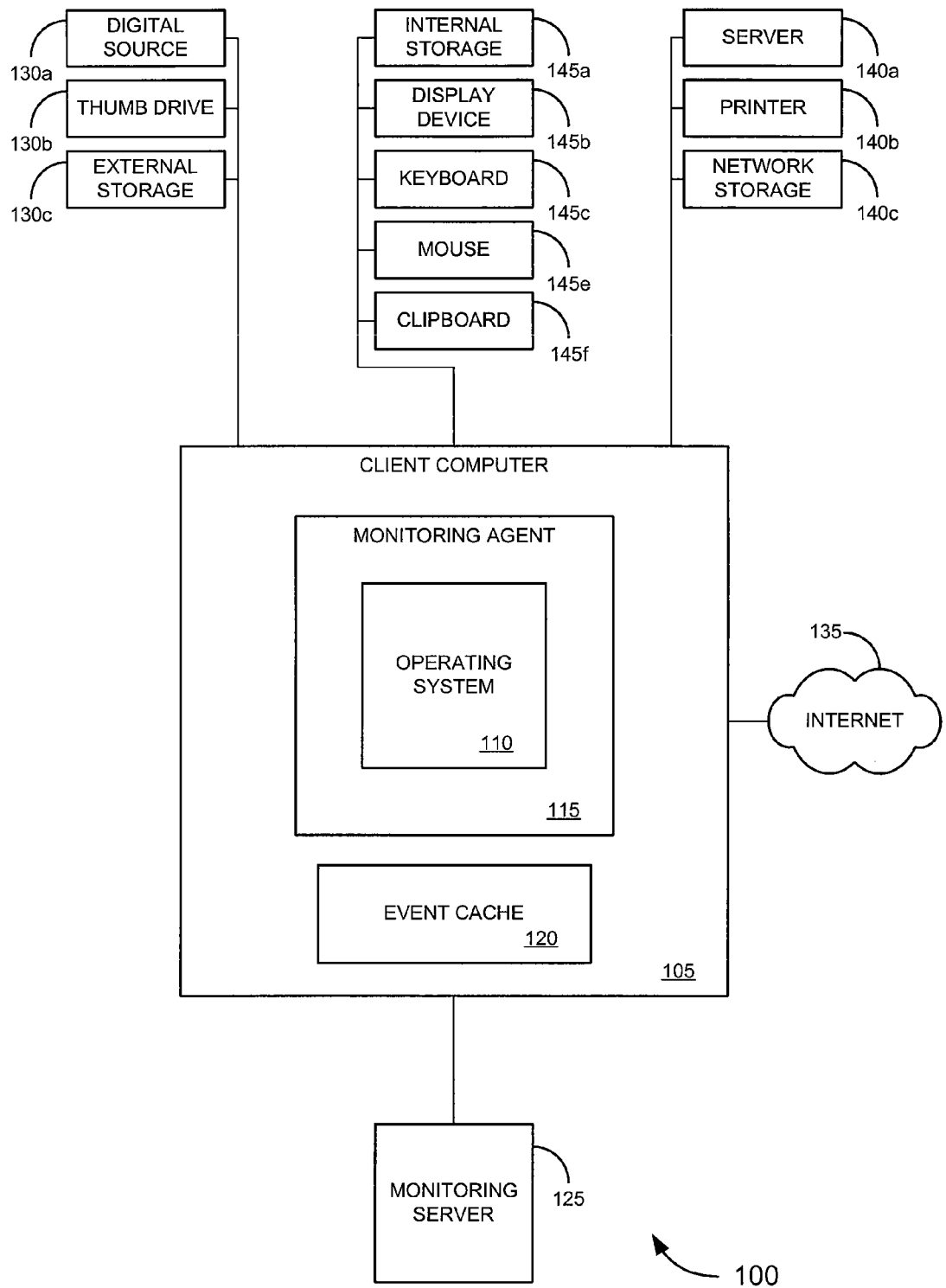
FIG. 1A is a generalized schematic diagram illustrating a system for monitoring and/or collecting events, in accordance with various embodiments of the invention.

FIG. 1A illustrates an exemplary system 100 for monitoring a computer. The system 100 comprises a client computer 105 (also referred to herein as a "monitored computer"), which comprises an operating system 110. The operating system 110 can be virtually any operating system, including without limitation any of the various varieties of Microsoft Windows™, Apple Macintosh OS™, UNIX™ (and/or any derivative operating systems, such as BSD, Linux, etc.), and/or the like. The client 105 also comprises an event monitoring agent 115; the event monitoring agent is capable of monitoring, analyzing and/or collecting events in accordance with methods of the invention, as described in further detail below. A monitoring agent may comprise a plurality of functional components, as described in further detail below. (It should be noted, however, that the structural organization of the monitoring agent is discretionary and can vary according to different embodiments of the invention.)

In a set of embodiments, the monitoring agent may store in an event cache 120, as described in more detail below, the content and context of some or all events that are generated by a user (and/or by the operating system 110, an application program, etc.) when utilizing the monitored client computer 105. At certain times (but possibly not always), the client 105 may be in communication with a monitoring server computer 125, which can be in communication with the event cache 120 and/or the monitoring agent 115, although such communications may not be apparent to the user of the client 105, as described elsewhere herein. The monitoring server computer 125 may comprise any appropriate operating system, including without limitation those described above, as well as a monitoring server application, which interacts with the monitoring agent 115 and/or event cache 120. The monitoring server may provide other services as well, including without limitation an event replay service, as described more fully in U.S. patent application Ser. No. 11/556,968, which is already incorporated by reference. In a set of embodiments, the monitoring server 125 communicates with the client 105 using an IP-based connection (such as via the Internet 135, etc.).

The client 105 may also be in communication with a variety of devices, including without limitation locally-connected devices 130 (including, merely by way of example, digital sources 130a such as cameras, etc., thumb drives 130b and other transient storage devices, and external hard drives 130c), network connections to the Internet 135 (and/or other online services, WANs and/or the like), LAN resources 140 (such as network servers 140a, printers 140b and/or network storage 140c, to name but a few examples). In addition, the client 105 may comprise (and/or be in communication with) a variety of local devices (both physical and virtual) 145, such as internal storage 145a, display devices 145b, input devices (such as a keyboard 145d and/or mouse 145c, to name a few examples), and a clipboard 145f (which can be used to hold data cut and/or copied from an application or the operating system 110).

Figure 1B:
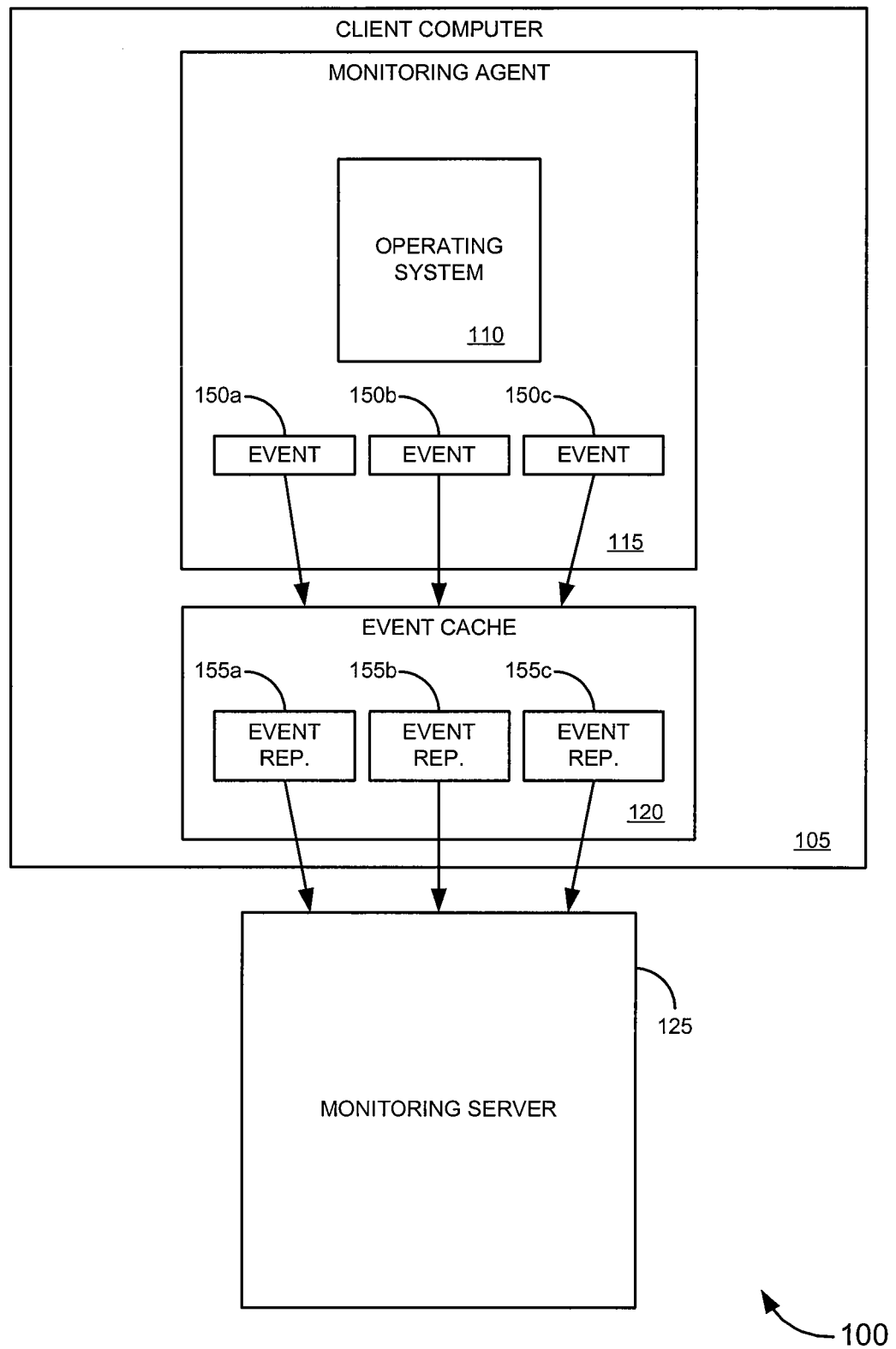
FIG. 1B is a functional diagram illustrating generally how the system of FIG. 1A can be used to monitor and/or collect events, in accordance with embodiments of the invention.

As illustrated by FIG. 1B, and described in more detail below, in some embodiments, the monitoring agent 115 is configured to capture selected events 150 occurring at the client 105. Representations 155 of captured events 205 then may be stored at the event cache 120. (As described more fully in U.S. patent application Ser. No. 11/556,942, already incorporated by reference, in some cases, a representation 155*a* of a particular event 150*a* may comprise a hash computed from a set of rich data associated with the event.) The stored representations 155 of the events 150 then can be transferred to the monitoring server 125 when connectivity is established between the monitoring server 125 and the client 105 (and/or at another appropriate time).

Figure 2:
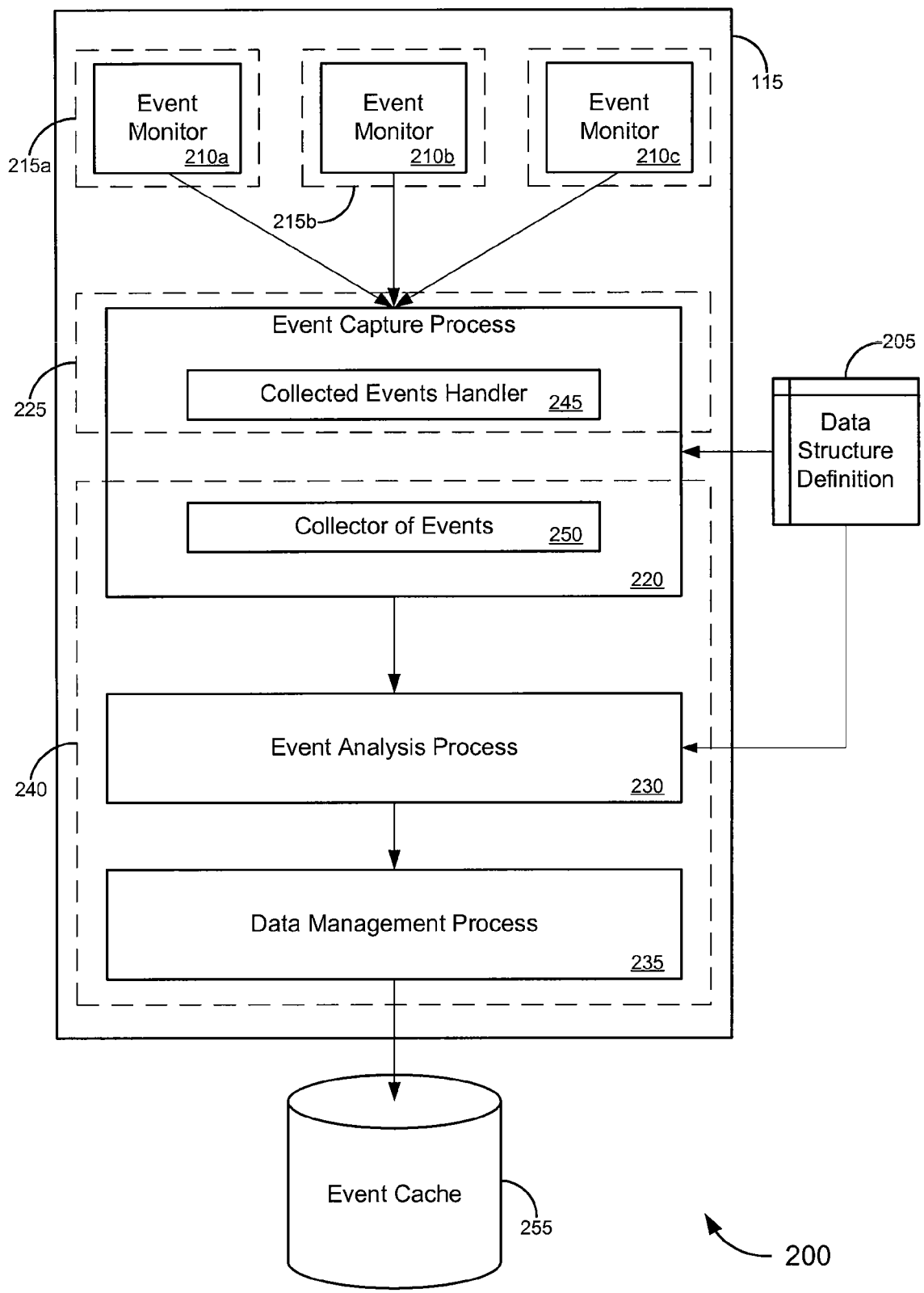
FIG. 2 is a functional diagram illustrating a system for monitoring, caching and collecting events, in accordance with various embodiments of the invention.

FIG. 2 illustrates a system 200 for monitoring, caching and/or collecting events (and/or representations thereof). The system 200 may be embodied by one or more functional components of the monitoring agent 115 on the monitored computer 105. (In some cases, such as the system 200 illustrated by FIG. 2, some or all of the functional components of the system might be integrated within a monitoring agent 115. In other cases, however, various components may be incorporated within other programs resident on the monitored computer 105 (and/or another computer).)

The system 200 includes a data structure definition 205, which defines a structure for storing representations of events. The system 200 also includes one or more event monitor processes 210, each of which may run in a thread of execution 215. In some cases, this thread is a common thread of execution with an application the process 210 monitors. Merely by way of example, a web browser application (not shown) might run in a thread 215*a*, and the monitor process 210*a* configured to monitor the web browser application might run in the same thread. In some cases, this feature is useful in disguising the operation of the monitoring agent 115, since it may appear to the user that the process 210 is not running if the process 210 merely shares a thread of execution with the application it monitors.

The system 200 also includes one or more event capture processes 220, which may run in a thread of execution 225 separate from the threads 215 used by the event monitor processes 210. In some embodiments, the system 200 further includes one or more event analysis processes 230 and/or one or more data management processes 235. One or more of these processes 230, 235 might run in another thread of execution 240.

In certain embodiments, the data structure definition 205 is used to define a structure that can be used by the event capture process 220 and/or the event analysis process 230 for holding information about events (including without limitation representations of events) in memory.

Figure 3:
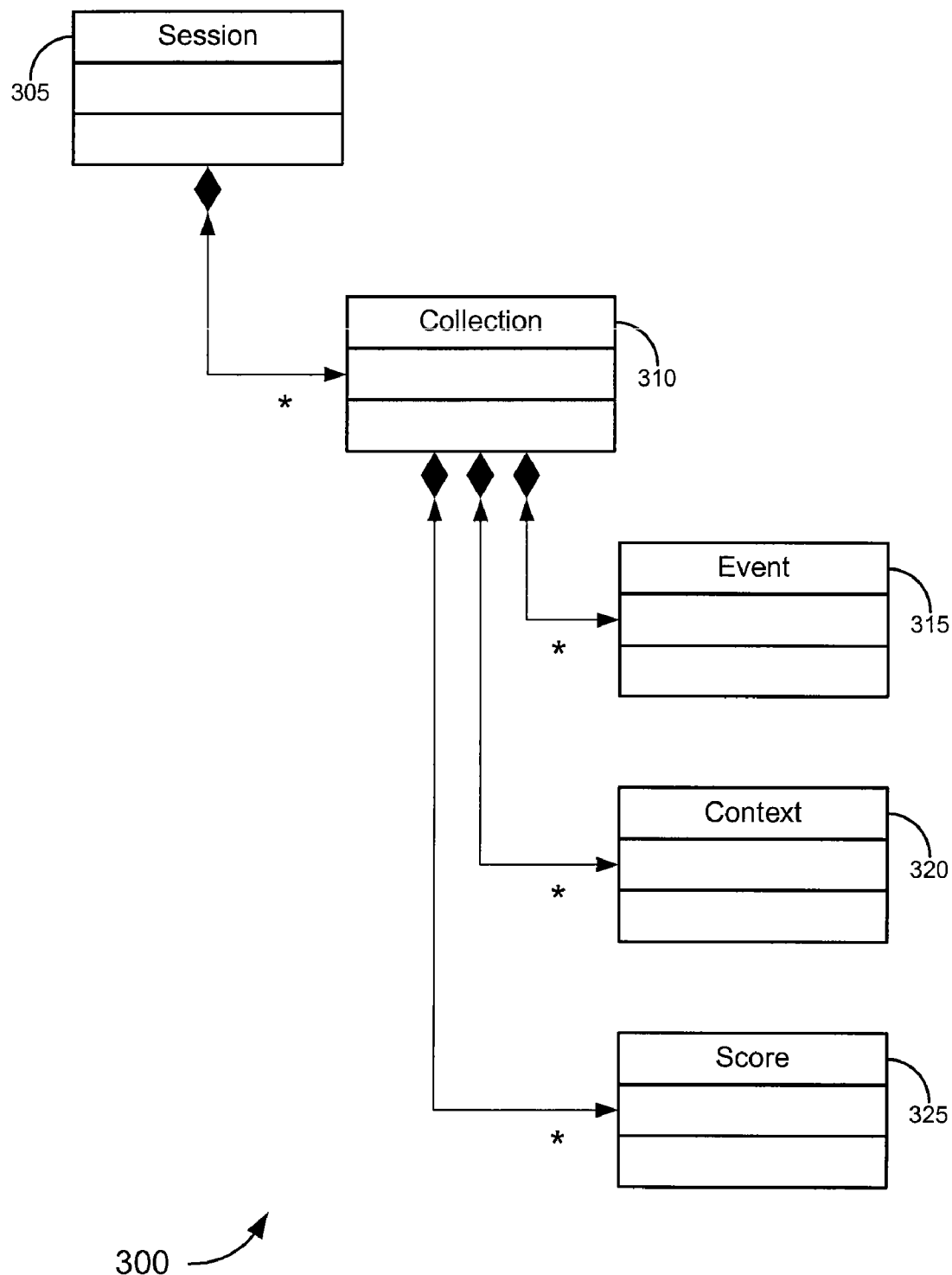
FIG. 3 is a block diagram illustrating an object model for holding one or more representations of events in a computer memory, in accordance with various embodiments of the invention.

The events that are to be captured on the monitored computer can be as granular as individual mouse movements and individual keystrokes, plus any and all other events created within one or more applications running on the workstation. Because of the potential volume of these low-level events, it may be necessary in some embodiments to devise an efficient structure for capturing, formatting, storing and retrieving these events. FIG. 3 illustrates one such possible structure.

A sample data structure 300 is illustrated by FIG. 3. The data structure definition 205 comprise a session container definition defining a session container 300 configured to hold a plurality of event collections 310. The session container therefore may a session context for the one or more event collections 310 stored therein. In some embodiments, a session 305 represents an extended interaction between a user and an application on the monitored computer. The data structure definition might further comprise a collection container definition, which defines a collection container 310 configured to hold a plurality of event objects 315; in some cases, the collection container 310 defines a collection context for one or more event objects 315 stored therein. During the course of the session 305 with an application, the user may perform one or more tasks using the capabilities of the application. Each task-specific application request may be assigned to a collection 310 within the session 305.

The data structure definition thus may include an event object definition, which is configured to hold a representation of an event 315 occurring on the monitored computer. In some cases, the event object is stored in a collection container 315. In a set of embodiments, of the events 315 that occurred during the performance of a given task within an application, including without limitation mouse movements, keystrokes and other activities are gathered together under the collection 310. Any substantial data content associated with the specific collection 310, such as the contents of a web-delivered page, or an image, might also be associated with the collection 310 within the session 305.

Optionally, there may also be an event context object definition, which defines an event context object 320 configured to hold information about a context of an event object 315 and/or an event score object definition, which defines an event score object 325 configured to hold a score of an event 315. In some cases, wherein an event context object 320 and/or an event score object 325 is stored in a collection container 310 and/or is associated with an event object 310.

This exemplar structure 300 provides an efficient representation of the events and data collected at the workstation. Based on the disclosure herein, one skilled in the art should appreciate, however, that other comparable organizational data structures may also be used; the structure illustrated in FIG. 3 is used in this description for convenience of reference only and is not intended to be limiting.

As noted above, in some embodiments, a first event monitor process 210*a* runs in a thread of execution 215*a* used by a first user application; the first event monitor process 210*a* may be configured to monitor one or more events occurring in the first user application and/or to notify the event capture process 220 of the existence of a first event of interest occurring in the first user application. Similarly, a second event monitor process 210*b* might run in a thread of execution 215*b* used by a second user application and/or might be configured to monitor one or more events occurring in the second user application and/or to notify the event capture process 220 of the existence of a second event of interest occurring in the second user application.

In various embodiments, then the event capture process 220 might be configured to receive one or more notifications from one or more event monitor processes 210. The notifications might be about one or more events of interest. The event capture process 220 may also be configured to capture the event(s) of interest, along with, in some cases, information about a context of each of the event(s) of interest. In some cases, the event capture process may run in a thread of execution 225 separate from those 215 of the event monitor process(es) 210.

In operation, the monitoring and capturing of events can take a variety of forms. Merely by way of example, in a set of embodiments, each application that is anticipated to generate events of interest is equipped with an application-specific event monitor 210 that operates under one of the threads of execution 215 used by the application. (In some cases, the event monitor might also include an application-specific event collector, which can assist the event capture process 220 in capturing the event). When an event of interest is detected within the application by the event monitor process 210, notification is made to the event capture process 220, perhaps using inter-process communication procedures known to those skilled in the art. The capture process 220, which, as noted, may operate under its own thread of execution 225, generates a representation of the event to be collected into an area of memory contained within a shared memory object. The representation of the event (which can be thought of, in some cases, as a copy of the event) might comprise, for example, a variety of system level notifications (such as mouse and/or keyboard activity, etc.), application data (such as HTML pages if, for example the application is a web browser), files associated with the event and/or the like. Representations can be generated for any of a variety of events, including, merely by way of example, any of the events described in detail in U.S. patent application Ser. No. 11/556, 942, already incorporated by references.

In a set of embodiments, by using these separate threads of execution, the marshalling of the collected events is decoupled from the execution path of the applications running on the workstation, thus providing minimal interference with the execution of the applications and again minimizing the chance that the activity of the system 200 will be discovered.

In some cases, the event capture process 220 comprises a collected events handler 245, which is responsible for obtaining/generating the representations of the events, and a collector of events 250, which is responsible for handling the processing of the events, as described below. Hence, event capture process 220 (and, in some cases, more particularly, the collected events handler 245) may, in some cases, store the representation of events in a shared memory object, which might be structured according to the data structure 300 described above. When the collected events handler 245 has one or more marshaled events that require processing, its notifies the collector of events 250 (perhaps using the appropriate inter-process communication mechanism provided by the monitored computer's operating system) that there are one or more events ready to be processed.

As noted above, the event capture process 220 (and/or more specifically in some cases, the collector of events 245) runs under its own thread of execution 225 and so is decoupled from the execution of the applications and their respective application-specific event collectors. In a set of embodiments, upon receipt of notification from the collected events handler 245, the collector of events 250 copies each of the events from the shared memory object maintained by the collected events handler 245 into a shared memory object managed by the collector of events 250, freeing up the memory in the shared memory object managed by the collected events handler 245, allowing the collected events handler 245 to gather more events, based, for example, on notifications from the event monitors 210.

An event analysis process 230 might be configured to analyze one or more events of interest and/or assign one or more scores to the event(s) of interest. (In some cases, the event analysis process runs in a thread of execution 240 separate from the thread of execution 225 used by the event capture process 220 and/or the collected events handler 245. In a set of embodiments, as illustrated here, the collector of events 250 may run in the thread of execution 240 of the event analysis process 230. Alternatively, it may run in the thread of execution 225 used by the collected events handler 245, such that the event capture process 220 runs in its own thread of execution.)

The score(s) may be based on the analysis of the event(s) of interest. Based, perhaps, on the score(s), the event analysis process 230 might also determine whether any of the event(s) should be collected/saved (for further analysis, replay, etc.). In some cases, the event analysis process 230 is configured to maintain (perhaps in a data structure 305 defined by the data structure definition 205 described above, and/or any other appropriate data structure), information about the context of the event(s), information about score(s) assigned to the event(s), and/or representation(s) of the event(s) themselves.

Merely by way of example, in accordance with some embodiments, the event capture process 220 (and/or more specifically, the collector of events 250) calls the event analysis process 230, passing each of the collected event objects in turn. The event analysis process 230 uses a series of configurable rules (examples of which are described more fully in U.S. patent application Ser. No. 11/556,942, already incorporated by reference) to analyze each of the collection events and contexts; the event analysis process 230 then calculates a score for the collection and adds the score to the collection object structure. If the result of the analysis by the event analysis process 230 indicates that the collection should be saved, the event analysis process 230, in some embodiments, calls the data management process 235 to store one or more events in the collection.

In a set of embodiments, then, the event analysis process 230 is the process that makes all of the decisions about which events and associated data are to be saved. When the event analysis process 230 calls the data management process 235 to save the events and data (e.g., in an event cache 255), the data management process 235 determines whether the objects are to be saved in memory or are to be saved to disk storage. The choice between saving objects in computer memory or saving them on disk storage is a user-configurable choice. Generally, in-memory storage will be lost when the monitored computer is shut down or re-booted; in contrast, disk storage of objects generally is persistent across computer outages.

Hence, the data management process 235, in accordance with some embodiments, might be configured to store information about one or more events of interest (perhaps in an event cache 255, which might, in some cases, reside on a non-volatile storage medium, such as a hard drive, a database, etc., and/or a volatile medium, such as RAM, etc.). Examples of event caches that can be used in various embodiments of the invention are described in more detail below.

In a set of embodiments, for example, the data management process 235 may be configured to saves the events and data in storage using a suitable structured object model, such as the model 300 described above. In an aspect of some embodiments, each user application session data comprises one or more collections made from user interactions with the application. Within each collection there might one or more events, one or more contexts containing the data associated with the events, and one or more scores computed by the event analysis process 230 and/or assigned to the collection and/or the events therein.

As described in more detail below, in some cases, system 200 provides a streaming interface for the management of some or all data stored in the event cache 255. Hence, for every object type that is contained by the event cache 255 there may be a separate stream interface for storing/accessing data therein. In an aspect of the invention, all object streams might be maintained in timestamp order by the data management process 235, which may return a stream of objects sorted in timestamp order, from a start to an ending time, ordered in ascending or descending order, as requested by the caller.

In some cases, all objects saved by the data management process 235 are initially saved in memory. If the Data Store is configured to use persistent disk storage (e.g., the cache 255), the data management process 235, at the completion of every collection or on some configurable time period, moves the objects from the in-memory object model store and stores them on disk using the stream-oriented facilities of the disk storage file system, which is described in more detail below. In particular embodiments, the data management process 235 also supports direct insertion, deletion or updating of one or more objects supplied in a stream to the data management process 235 by the caller.

The users of the data management process 235 streams interface (including, merely, by way of example, other processes in the system 200) may not need to be aware of whether the data management process 235 might make use of in-memory or disk storage for the saving of the object streams. When disk storage is used for saving the object streams, the data management process 235 makes use of the streaming file storage capabilities provided by the disk storage file system, which is described below. (Alternatively, in some embodiments, the features of a native file system of the operating system might be used, in lieu of and/or in addition the file streams described herein.)

Figure 4:
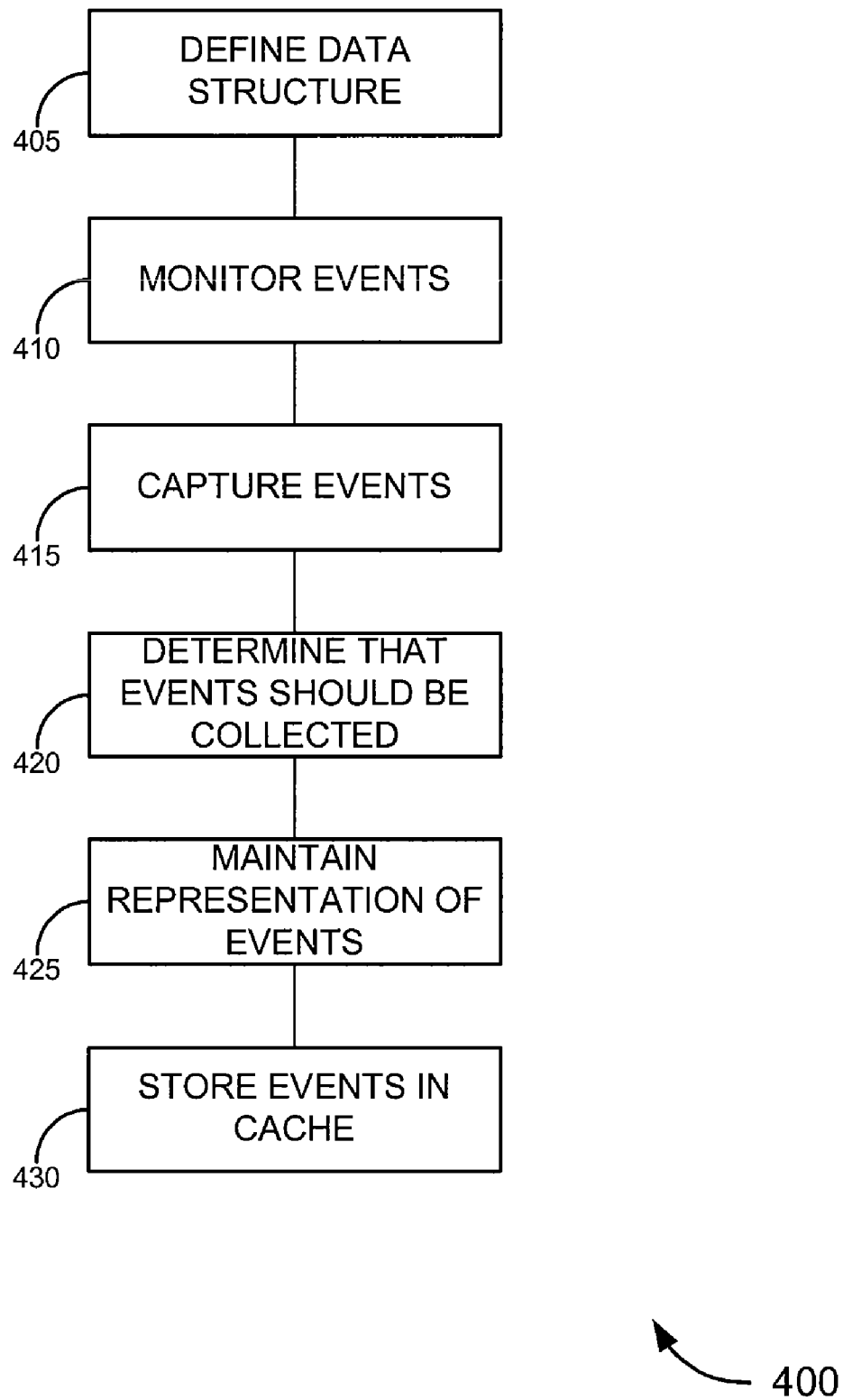
FIG. 4 is a process flow diagram illustrating a method of monitoring, caching, and collecting events, in accordance with various embodiments of the invention.

FIG. 4 illustrates a method 400 of monitoring, analyzing and/or storing events, in accordance with various embodiments of the invention. At block 405, a data structure may be defined, perhaps using a data structure definition as described above. This data structure can be used to store representations of events (e.g, in memory and/or on disk), as described above.

The method 400 may further comprise monitoring one or more events (block 410), capturing one or more events of interest (block 415) and/or determining that one or more of the capture events should be collected and/or stored (block 420) (e.g., based on any analysis and/or scoring of the events, as described in more detail above). A representation of the events may be maintained (block 425), for example in a memory structure defined by the data structure definition. If appropriate, one or more events may be stored in a cache (block 430), which may implement a disk storage file system which is described in further detail below.

Figure 5:
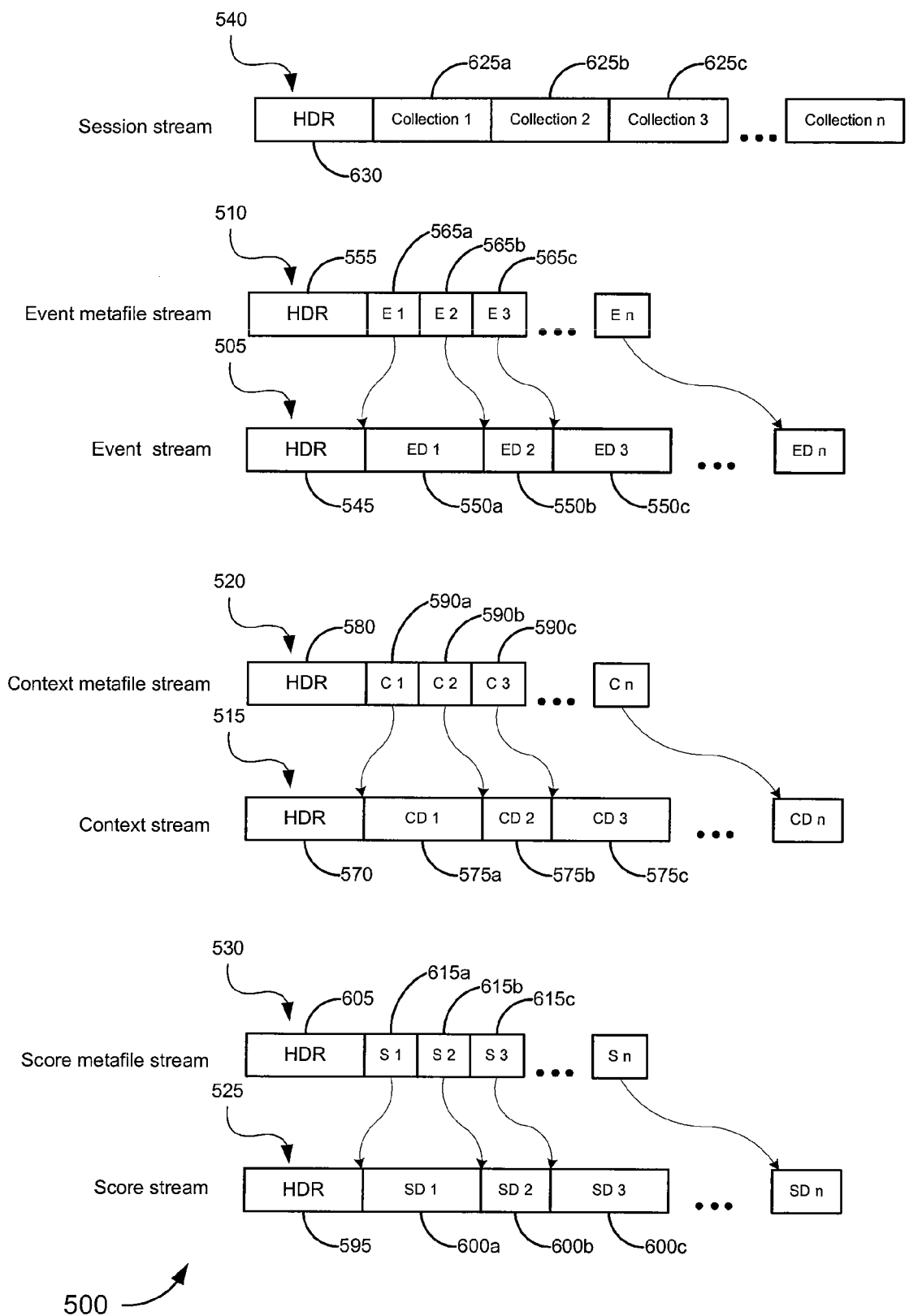
FIG. 5 is a generalized block diagram illustrating an exemplary data structure for storing representations of events, in accordance with various embodiments of the invention.
Figure 6:
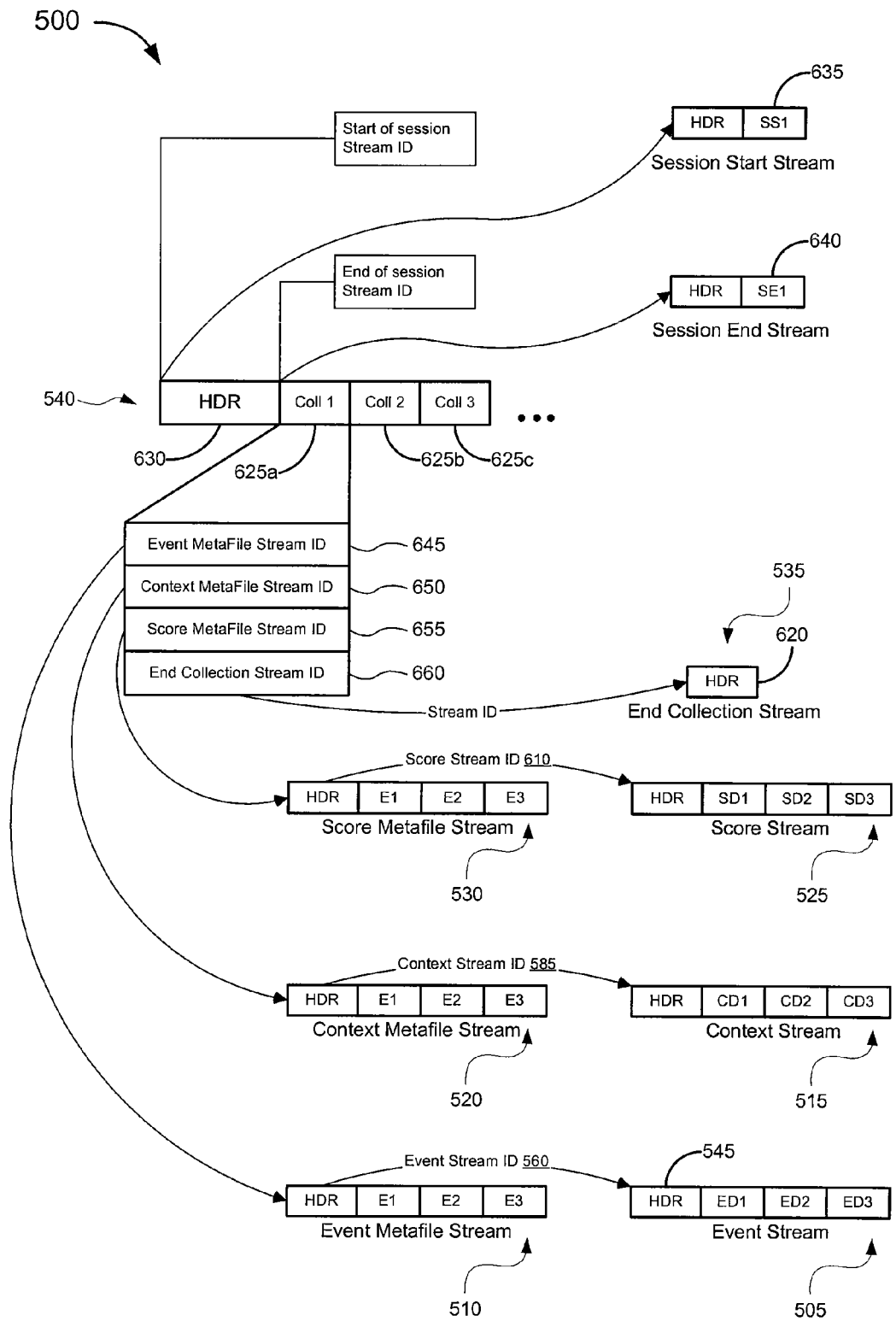
FIG. 6 is a detailed block diagram illustrating the exemplary data structure of FIG. 5.

In some cases, an event cache may be implemented using a disk storage file system in accordance with embodiments of the invention. If the system is configured to use disk storage for saving the events, a suitable high-speed file system provides optimum performance and assists in avoiding detection of the system (e.g., through reduced performance of the monitored computer. FIG. 5 provides a generalized illustration of an exemplar implementation of a stream-oriented file system 500 optimized for storing the components of the object model illustrated in FIG. 3, and FIG. 6 provides a more detailed illustration of the same file system 500. The file system 500 may be used to store an event cache, in accordance with some embodiments of the invention. In a set of embodiments, the disk storage file system 500 (and, therefore, the event cache) may comprise a plurality of file streams, including without limitation one or more of the following: an event file stream 505 and/or an event metafile stream 510, an event context file stream 515 and/or an event context file stream 520, an event score file stream 525 and/or an event score metafile stream 530, an end-of-collection file 535 stream and/or a session file stream 540.

Merely by way of example, an event file stream might comprise an event file header 545 and/or a plurality of event data segments 550 (which might, in some cases be variable-length data segments). Again, merely by way of example, a first event data segment 550*a* might comprise a representation of a first event of interest, while a second event data segment 550*b* might comprise a representation of a second event of interest.

Figure 7:
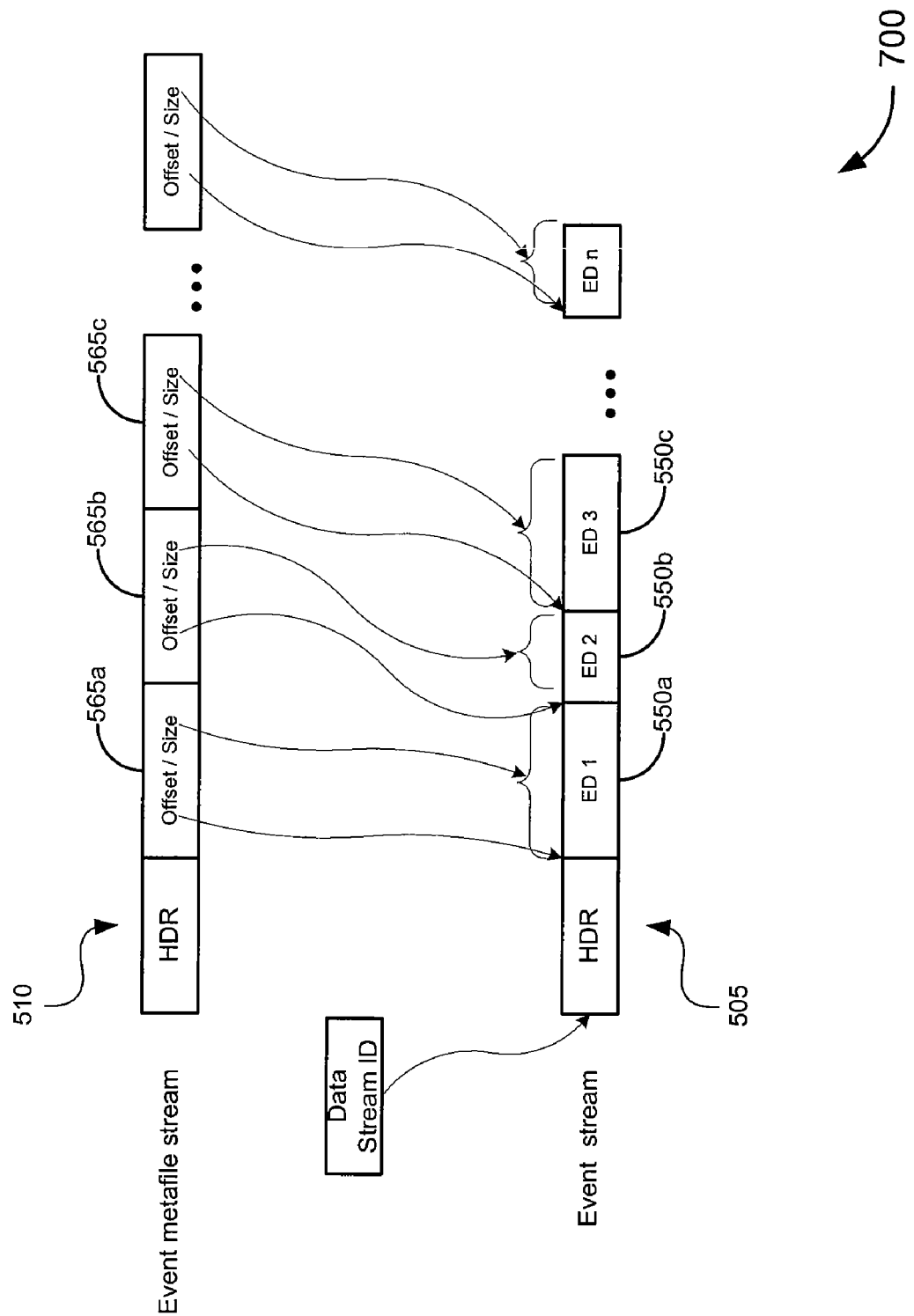
FIG. 7 is a detailed block diagram illustrating a file stream and a metafile stream for storing data, in accordance with various embodiments of the invention.

An event metafile stream, then, might comprise an event metafile header 555 (which might comprise a stream identifier 560 for the event file stream 505 and/or a plurality of references 565 to the event file stream. In a set of embodiments, these references might be fixed-length references. For instance, in some cases, a first reference might refer to the event file stream and/or might comprise a data segment identifier 565*a* identifying an event data segment 550*a*, as described above, while a second reference might refer again to the event file stream and/or might comprise a data segment identifier 565*b* identifying a second event data segment 550*b*. Referring now to FIG. 7, the data segment identifiers 565 might comprise character offset values associated with the data segments to which they refer. Alternatively and/or additionally, the references 565 might comprise values of the length of the data segments to which they refer. Using this combination of character offset values and data segment lengths then, a reference can provide an identification within a stream of the desired variable-length data segment, such that a calling process can identify the start point in the stream.

Similarly, in some cases, an event context stream 515 might comprise an event context file header 570 and/or one or more event context data segments 575 (which may, in an embodiment, be variable-length data segments). An event context data segment 575, for example, might comprise information about the context of an event (of which a representation might be stored in an event data segment, as noted above). An event context metafile stream 520, then, might comprise an event context metafile header 580 (which might comprise a stream identifier 585 for an event context file stream and/or one or more references 590 (which might be fixed-length references) to the event context file stream. Such a reference might refer to the event context file stream 515 and/or comprise a data segment identifier 590*a* identifying an event context data segment. The data segment identifiers (e.g., 590*a*) might comprise character offset values associated with the data segments (e.g., 575*a*) to which they refer. Alternatively and/or additionally, the references might comprise values of the length of the data segments to which they refer. (While the character offset values and data segment length values for the event context file stream are not pictured on FIG. 7, they operate similarly in concept to those for the event file stream, described above.)

An event score file stream 525 (as depicted in FIG. 6) then, might comprise an event score file header 595 and/or one or more event score data segments 600 (which may, in an embodiment, be variable-length data segments). An event score data segment 600, for example, might comprise information about the score assigned to an event (of which a representation might be stored in an event data segment, as noted above). An event score metafile stream 530, then, might comprise an event context score header 605 (which might comprise a stream identifier 610 for the event score file stream 525) and/or one or more references 615 (which might be fixed-length references) to the event score file stream 525. Such a reference 615*a* might refer to the event score file stream 525 and/or comprise an identifier identifying an event score data segment. The data segment identifiers (e.g., 615*a*) might comprise character offset values associated with the data segments (e.g., 600*a*) to which they refer. Alternatively and/or additionally, the references might comprise values of the length of the data segments to which they refer. (While the character offset values and data segment length values for the event score file stream are not pictured on FIG. 7, they operate similarly in concept to those for the event file stream, described above.)

An end-of-collection file stream 535 comprises, in some embodiments, an end-of-collection header 620, which might indicate the end of a collection (e.g., 625a) of collected events. A session file stream 540 might comprise a session header 630 and/or one or more collection containers 625. The session header 630 might comprise a session start stream identifier 635 (which might identify the beginning of a session) and/or a session end identifier 640 (which might identify the end of a session). The collection container(s) 625 each might comprise a reference 645 to an event metafile stream 510 (which, as noted above, can be used, for example, to identify and/or refer to an event file stream 605 storing events in the collection), a reference 650 to an event context metafile stream 520 (which, as noted above, might be used to identify and/or refer to an event context file stream 515 storing a context for one or more of the events in the collection), a reference 655 to an event score metafile stream 530 (which, as noted above, might be used to identify and/or refer to an event score file stream 525 storing scores assigned to one or more events in the collection), and/or reference 660 to an end-of-collection file stream 535 (which, as noted above, can signal the end of a collection 625a of events).

Figure 9:
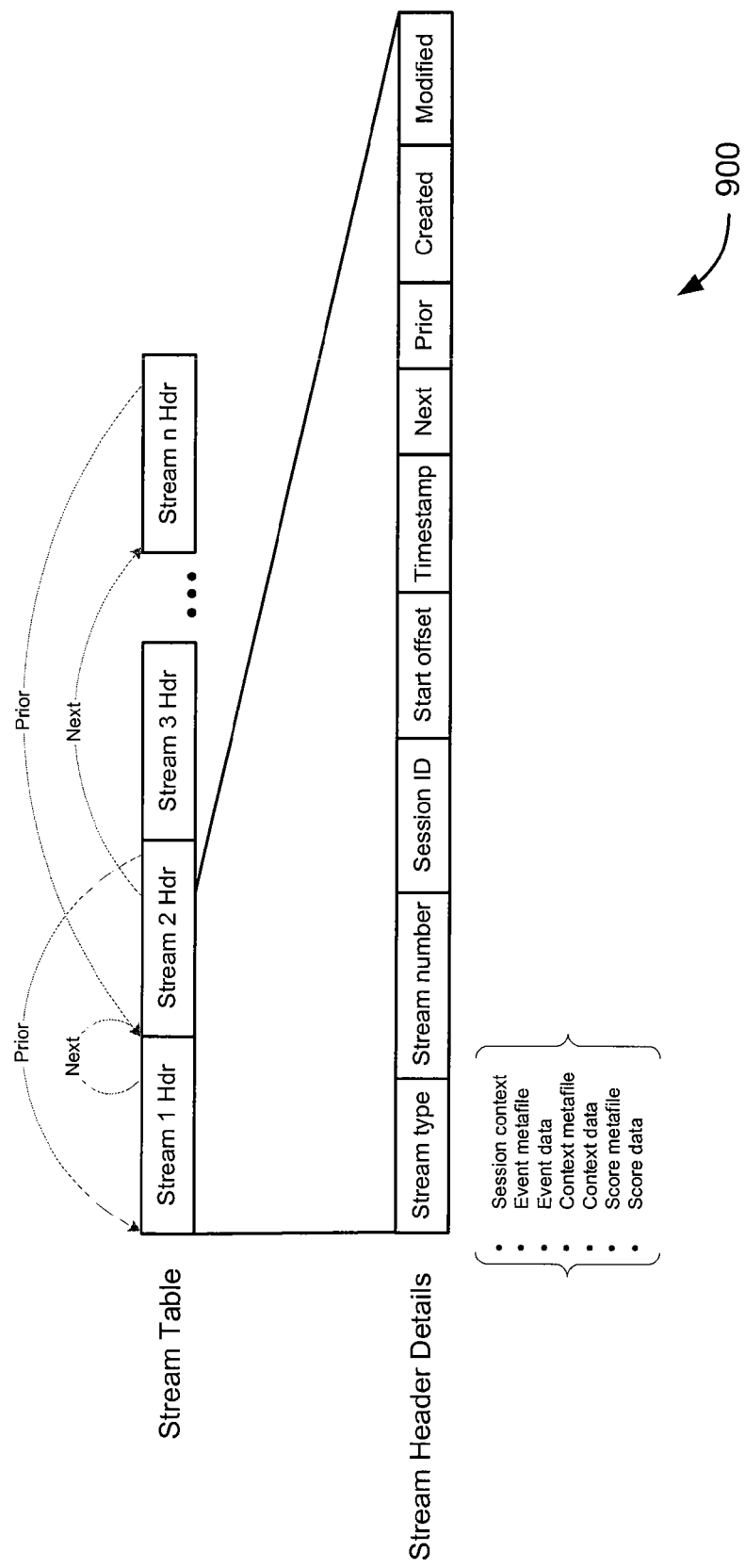
FIG. 9 is a generalized block diagram illustrating a plurality of file streams for storing data, in accordance with various embodiments of the invention.

Hence, exemplar file system 500 provides a high-throughput stream-oriented disk-based storage file structure that is designed to accept large volumes of event data structured using the exemplar object model illustrated in FIG. 3. To manage the speedy location and retrieval of information within the file system 500, a file system table, as illustrated in FIG. 9, may be maintained for some or all file streams within the file system 500. (FIG. 9 illustrates a table 900 for an event file stream; similar tables may be used for other file streams described above.) Hence, in a set of embodiments, each file stream (e.g., 505-540) allocated within the file system 500 may be represented by a table similar to the table 900.

In some cases, each file stream entry in the table identifies the stream id, where it starts on the disk, the stream type, its timestamp plus forward and backward pointers. In an aspect of some embodiments, some or all of the file stream table entries are linked together as a linked list, ordered by timestamp to provide rapid location of a file stream within the file system 500 as well as supporting the next( ) and previous( ) functions within each file system type.

In some cases, the objects represented by the exemplar object model are each stored in the file system 500 using two file streams to represent each object. As an example of a set of embodiments, take the event object storage pair of streams 505, 510 as illustrated in FIG. 5. The event metafile stream 510 provides an identifying header record structure 545 followed by one or more fixed-length record segments 565, labeled E1, E2, E2, and En in FIG. 3. All of the variable data associated with the stream of events represented in the event metafile stream 510 may be retained in a separate event file stream 505. The event file stream 505 provides an identifying header record 545, followed by one or more variable length data structures 550, labeled ED1, ED2, ED3, and EDn in FIG. 5.

The fixed length records (565a, 565b, 565c, respectively) in the event metafile stream 510 contain pointers to the corresponding variable length data segments (550a, 550b, 550c, respectively) contained in the event file stream 505. In addition, the fixed length event metafile stream records 565a, 565b, 565c may contain identifying and timestamp information unique to each of their respective saved events 550a, 550b, 550c.

In a set of embodiments, the file system programming interface ("API") delivers back to the caller the associated stream of data, sorted in timestamp order and/or bounded by a start and finish time provided by the requester. The API also permits a requester to access any location in the event file stream 505 data records directly and, in some cases, supports direct inserting of new information, updating of existing information and/or deletion of existing information. (As noted above, the event metafile stream 510 and the event file stream 505 are used here as an exemplar; all functions and capabilities may apply equally to all other metafile streams and data streams stored by the file system 500.)

In some cases, the streaming object storage management facilities provided by the file system 500 may be provided solely for use by the data management process (and/or other processes of the monitoring agent) to implement the capability to store object streams persistently on disk. That is, in a set of embodiments, the file system 500 and its components may be invisible and/or undetectable by a normal user of the monitored computer on which the file system 500 resides.

Merely by way of example, in some embodiments, the file system 500 may be implemented as a proprietary file system structure contained within an allocated area of disk storage. The selected method for allocating the disk storage will, to the extent possible within the native file system available on the workstation, make use of hidden files, system files, hidden file streams, hidden disk partitions or other available disk storage allocation mechanisms designed to obfuscate the existence of the file system's 500 allocated disk storage.

In addition, to avoid tampering with the disk-based event cache, or to avoid forensic examination and alteration of the disk-based persistent cache, the file system 500 may use an encryption algorithm prior to committing any data to disk storage. The manner of encryption, the algorithms used and the keys used to implement this encryption layer are not described here; they do not alter the functionality of the cache.

In a set of embodiments, the event analysis process, described above with respect to FIG. 3, is responsible for determining the disposition of monitored events. Using a set of configurable rules, the event analysis process can determining which sessions, collections and/or events should be sent to a collection and/or monitoring server. An exemplary procedure for making this determination is described more fully in U.S. patent application Ser. No. 11/556,942 and need not be described in further detail herein.

When the event analysis process analyzes the saved collections, it may decide that not only is the current collection eligible for sending to the collection server, but that certain preceding saved collections and events (also referred to herein as "prologue events" should also be sent to the collection server. Merely by way of example, in some embodiments, the event analysis process, perhaps using the facilities of the data management process, will request that a stream of data (which may be ordered chronologically) for the affected sessions, collections and/or events be directly updated to mark them as needing to be sent to the collection server. In performing this procedure, the event analysis process might make use of the time-ordered stream delivery and/or the direct update capabilities of the file system (described above) to perform these functions. The data management process, in turn, might update the in-memory object store and/or will use the facilities of the file system to mark and update the appropriate objects.

Figure 8:
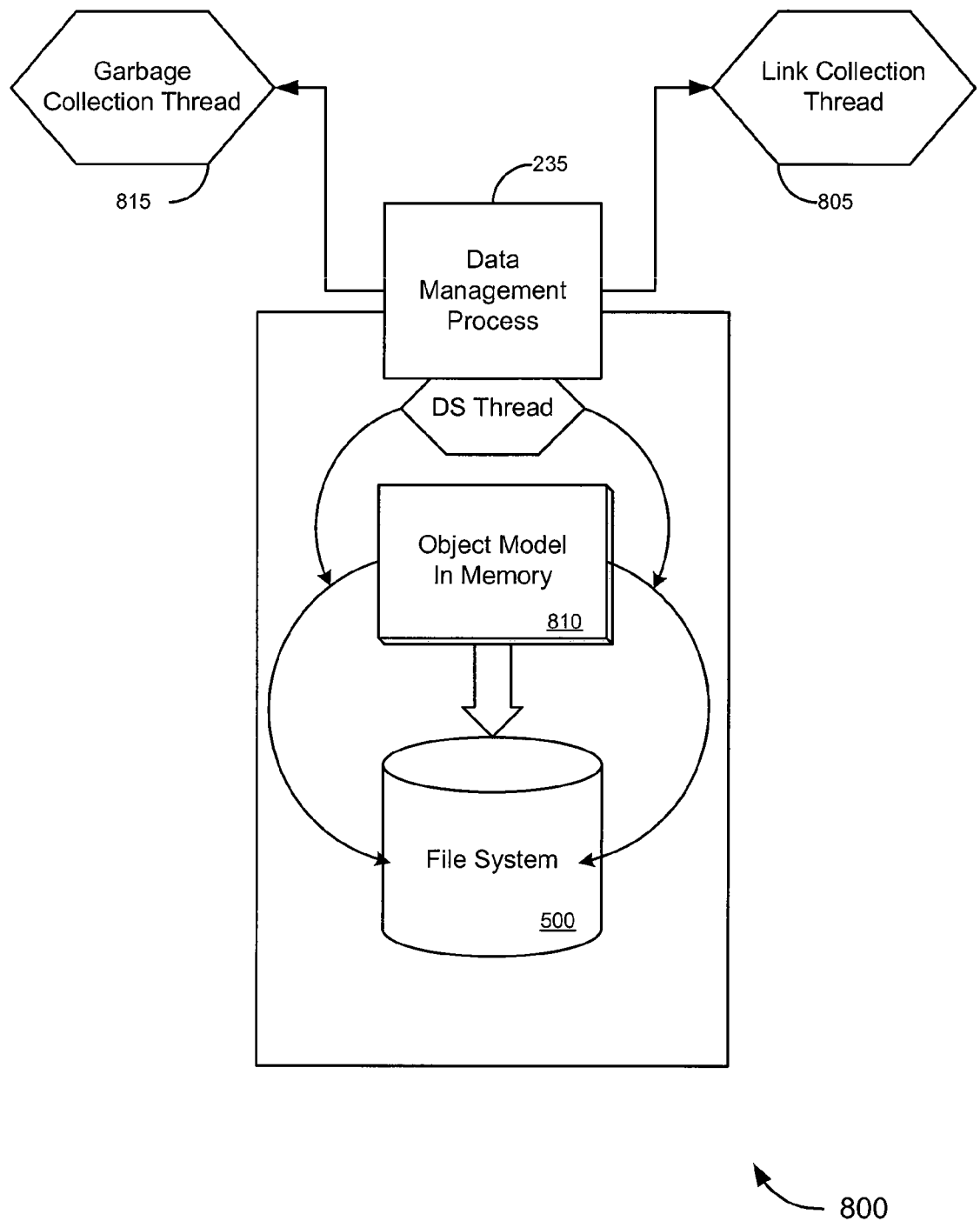
FIG. 8 is a generalized block diagram illustrating the collection and disposal of event representations, in accordance with various embodiments of the invention.

FIG. 8 illustrates an architecture 800 for providing such collection and/or object cleanup services. The link collection thread 805, may be activated from time to time. It requests that the data management process 235 prepare a packet of objects that have been marked for collection at the request of the event analysis process.

The data management process 235, using either the in-memory object model 810 or the file system 500, prepares a stream of all sessions, collections, events and other objects marked for collection, formats and presents them to the link collection thread 805.

The link collection thread 805 is responsible for transmitting the stream of objects to the collection/monitoring server and/or recording when each object has been successfully received and retained by the collection server. Upon receiving one or more indications of successful object receipt from the collection server, the link collection thread 805 calls the data management process 235 and requests the data management process 235 to mark the objects in the associated stream as having been successfully transmitted, making all such objects eligible for disposal. Accordingly, the data management process 235, using the in-memory object store 810 or the facilities of the file system 500, might directly update all of the objects to indicate their successful transmission.

The event cache is responsible for saving some or all objects streamed in via the data management process 235 until those objects are no longer required. The determination of when objects are no longer required is managed by a combination of the event analysis process when analyzing the objects for retention and notification of the successful collection by the link collection thread 235 of those objects that were marked for collection by the collection server.

The event analysis process, perhaps using the rules supplied through a configuration process described in U.S. patent application Ser. No. 11/556,942, may be aware of the oldest unmarked objects that must be retained by the data management process 235. The event analysis process may also, under control of configured rules, mark certain objects or classes of objects or objects saved from a certain source as not eligible for deletion from the event cache.

As illustrated in FIG. 8, a garbage collection thread 815 is activated from time to time for the purpose of removing stale objects from the cache. The garbage collection thread 815 may be called/activated either on some configurable periodic basis and/or when the available space in the file system 500 and/or memory 810 is determined to have reached some threshold.

The garbage collection thread 815 uses the data management process 235 to return a partial list (perhaps ordered by ascending order of timestamp and/or starting with the oldest) of objects saved in the cache, and/or all objects in all streams that are eligible for deletion. The garbage collection thread 815 then instructs the data management process 235 to delete all of the objects in the list. The data management process 235, upon completion of the delete requests, may automatically reclaims for reuse the space occupied in the cache by the deleted objects. If the required minimum threshold of available cache space has not yet been achieved, the garbage collection thread 815 may repeat the deletion of eligible stale objects until the threshold is reached or there are no more objects eligible for deletion.

Figure 10:
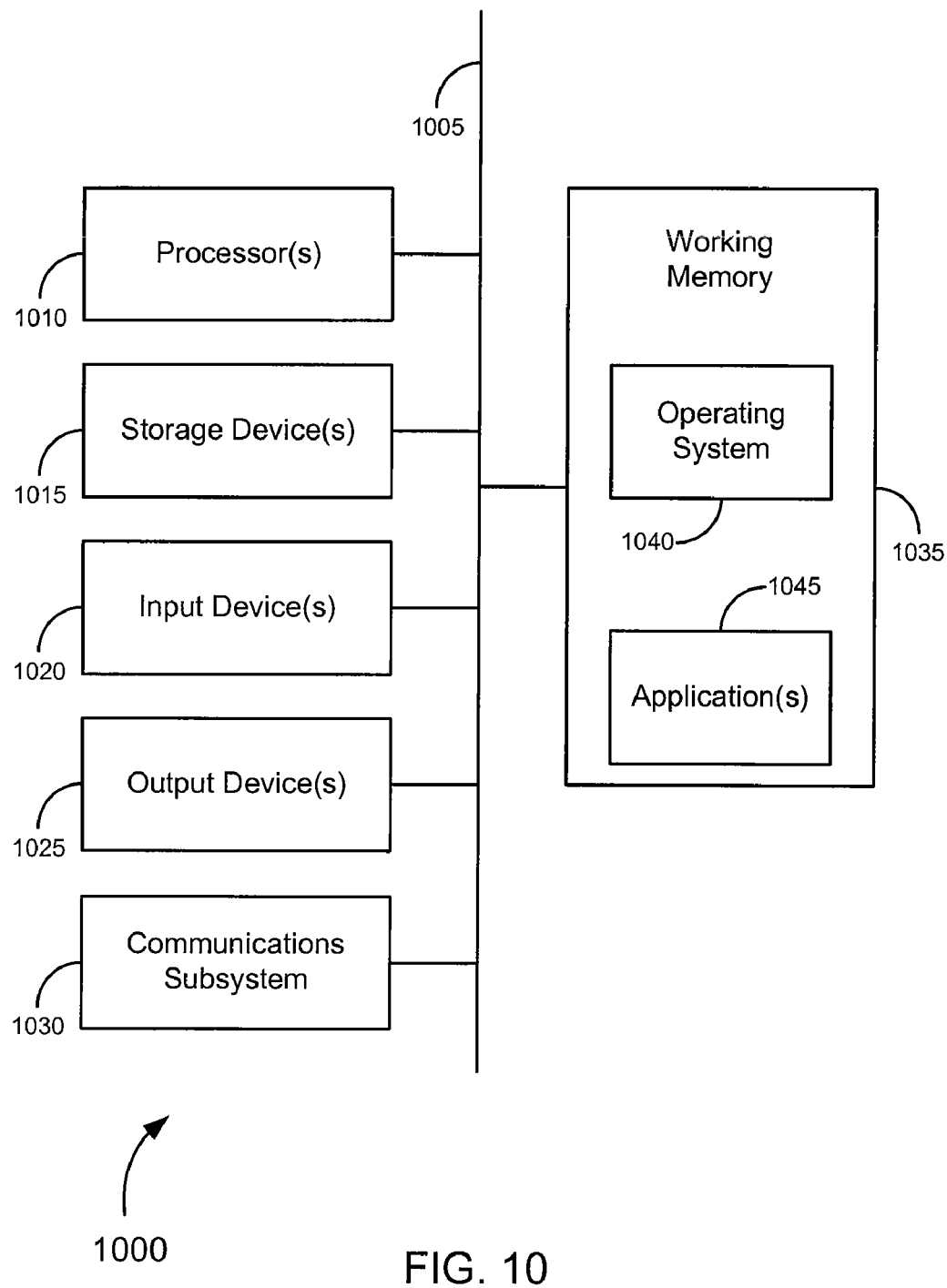
FIG. 10 is an generalized architectural diagram of a computer system, in accordance with various embodiments of the invention.

FIG. 10 provides a generalized schematic illustration of one embodiment of a computer system 1000 that can perform the methods of the invention and/or the functions of computer, such as the computers 105, 125 described above. FIG. 10 is meant only to provide a generalized illustration of various components, any of which may be utilized as appropriate. The computer system 1000 can include hardware components that can be coupled electrically via a bus 1005, including one or more processors 1010; one or more storage devices 1015, which can include without limitation a disk drive, an optical storage device, solid-state storage device such as a random access memory ("RAM") and/or a read-only memory ("ROM"), which can be programmable, flash-updateable and/or the like (and which can function as a data store, as described above). Also in communication with the bus 1005 can be one or more input devices 1020, which can include without limitation a mouse, a keyboard and/or the like; one or more output devices 1025, which can include without limitation a display device, a printer and/or the like; and a communications subsystem 1030; which can include without limitation a modem, a network card (wireless or wired), an infra-red communication device, and/or the like).

The computer system 1000 also can comprise software elements, shown as being currently located within a working memory 1035, including an operating system 1040 and/or other code 1045, such as an application program as described above and/or designed to implement methods of the invention. The operating system can be virtually any appropriate operating system, including without limitation any of the various varieties of Microsoft Windows™, Apple Macintosh OS™, UNIX™ (and/or any derivative operating systems, such as BSD, Linux, etc.), and/or the like, as well as, in some cases, task-specific and/or embedded operating systems.

Those skilled in the art will appreciate that substantial variations may be made in accordance with specific embodiments and/or requirements. For example, customized hardware might also be used, and/or particular elements might be implemented in hardware, software (including portable software, such as applets), or both.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for storing representations of monitored events on a monitored computer, the system comprising a non-volatile storage medium, a processor in communication with the non-volatile storage medium, and a set of instructions executable by the processor, the set of instructions comprising:

a data structure definition defining a structure for storing representations of events, the data structure definition comprising:
  a) a session container defining a session container configured to hold a plurality of event collections, the session container defining a session context for one or more event collections stored therein;
  b) a collection container definition defining a collection container configured to hold a plurality of event objects, the collection container defining a collection context for one or more event objects stored therein;
  c) an event object definition configured to hold a representation of an event occurring on the monitored computer, wherein the event object is stored in a collection container;
  d) an event context object definition defining an event context object configured to hold information about a context of an event object, wherein the event context object is stored in a collection container and is associated with an event object; and
  e) an event score object definition defining an event score object configured to hold a score of an event, wherein the event score object is stored in a collection container and is associated with an event object;

a plurality of event monitor processes comprising:
  a) a first event monitor process running in a thread of execution used by a first user application, the first event monitor process being configured to monitor one or more events occurring in the first user application and to notify an event capture process of the existence of a first event of interest occurring in the first user application; and
  b) a second event monitor process running in a thread of execution used by a second user application, the second event monitor process being configured to monitor one or more events occurring in the second user application and to notify an event capture process of the existence of a second event of interest occurring in the second user application;

an event capture process running in a thread of execution separate from the threads of execution used by the first and second user applications, the event capture process being configured to:
  a) receive a notification from the first event monitor process about the first event of interest;
  b) capture the first event of interest for analysis by an event analysis process;
  c) capture information about a context of the first event of interest;
  d) receive a notification from the second event monitor process about the second event of interest;
  e) capture the second event of interest for analysis by an event analysis process; and
  f) capture information about a context of the second event of interest;

an event analysis process running in a thread of execution separate from the threads of execution used by the first and second user applications, the event analysis process being configured to:
  a) analyze the first event of interest;
  b) based on an analysis of the first event of interest, assign a score to the first event of interest;
  c) determine, based on the score assigned to the first event of interest, that the first event of interest should be collected for further analysis;
  d) maintain, in a data structure defined by the data structure definition, the information about the context of the first event, the score assigned to the first event, and a representation of the first event;
  e) analyze the second event of interest;
  f) based on analysis of the second event of interest, assign a score to the second event of interest;
  g) determine, based on the score assigned to the second event of interest, that the second event of interest should be collected for further analysis; and
  h) maintain, in the data structure defined by the data structure definition, the information about the context of the second event, the score assigned to the second event, and a representation of the second event; and a data management process configured to store information about the first and second events of interest in an event cache on the non-volatile storage medium, the event cache comprising:
  a) an event file stream comprising an event file header and a plurality of variable-length event data segments, the plurality of variable-length data segments comprising:
    (i) a first variable-length event data segment comprising a representation of the first event of interest; and
    (ii) a second variable-length event data segment comprising a representation of the second event of interest;
  b) an event metafile stream comprising an event metafile header and a plurality of fixed-length references to the event file stream, the event metafile header comprising a stream identifier for the event file stream, and the plurality of fixed-length references to the event file stream comprising:
    (i) a first fixed-length reference referring to the event file stream and comprising a first data segment identifier identifying the first variable-length event data segment; and
    (ii) a second fixed-length reference referring to the event file stream and comprising a second data segment identifier identifying the second variable-length event data segment;
  c) an event context file stream comprising an event context file header and a plurality of variable-length event context data segments, the plurality of variable-length event context data segments comprising:
    (i) a first variable-length event context data segment comprising the information about the context of the first event of interest; and
    (ii) a second variable-length event context data segment comprising information about the context of the second event of interest;
  d) an event context metafile stream comprising an event context metafile header and a plurality of fixed-length references to the event context file stream, the event context metafile header comprising a stream identifier for the event context file stream, and the plurality of fixed-length references to the event context file stream comprising:
(i) a third fixed-length reference referring to the event context file stream and comprising a third data segment identifier identifying the first variable-length event context data segment; and
(ii) a fourth fixed-length reference referring to the event context file stream and comprising a fourth data segment identifier identifying the second variable-length event context data segment;
e) an event score file stream comprising an event score file header and a plurality of variable-length event score data segments, the event score metafile header comprising a stream identifier for the event score file stream, and the plurality of variable-length score data segments comprising:
(i) a first variable-length event score data segment comprising information about the score assigned to the first event of interest; and
(ii) a second variable-length event score data segment comprising information about the score assigned to the second event of interest;
f) an event score metafile stream comprising an event metafile header and a plurality of fixed-length references to the event score file stream, the plurality of fixed-length references to the event score file stream comprising:
(i) a fifth fixed-length reference referring to the event score file stream and comprising a fifth data segment identifier identifying the first variable-length event score data segment; and
(ii) a sixth fixed-length reference referring to the event score file stream and comprising a sixth data segment identifier identifying the second variable-length event score data segment;
g) an end-of-collection file stream comprising an end-of-collection header; and
h) a session file stream comprising a session header and a collection container, the session header comprising a session start stream identifier and a session end stream identifier, the collection container comprising a reference to the event metafile stream, a reference to the event context metafile stream, a reference to the event score metafile stream, and a reference to the end-of-collection file stream.

2. A system as recited by claim 1, wherein the event analysis process runs in a thread of execution separate from the thread of execution used by the event capture process.

3. A system as recited by claim 1, wherein:
the first data segment identifier comprises a character offset value associated with the first variable-length event data segment;
the second data segment identifier comprises a character offset value associated with the second variable-length event data segment;
the third data segment identifier comprises a character offset value associated with the first variable-length event context data segment;
the fourth data segment identifier comprises a character offset value associated with the second variable-length event context data segment;
the fifth data segment identifier comprises a character offset value associated with the first variable-length event score data segment; and
the sixth data segment identifier comprises a character offset value associated with the second variable-length event score data segment.

4. A system as recited by claim 1, wherein:
the first fixed-length reference further comprises a value of the length of the first variable length event data segment;
the second fixed-length reference further comprises a value of the length of the second variable length event data segment;
the third fixed-length reference further comprises a value of the length of the first variable length event context data segment;
the fourth fixed-length reference further comprises a value of the length of the second variable length event context data segment;
the fifth fixed-length reference further comprises a value of the length of the first variable length event score data segment; and
the sixth fixed-length reference further comprises a value of the length of the second variable length event score data segment.

5. A system as recited by claim 1, wherein:
the event metafile header comprises a first stream identifier identifying the event file stream;
the event score metafile header comprises a second stream identifier identifying the event score file stream; and
the event context metafile header comprises a third stream identifier identifying the event context file stream.

6. A system for storing representations of monitored events on a monitored computer, the system comprising a non-volatile storage medium, a processor in communication with the non-volatile storage medium, and a set of instructions executable by the processor, the set of instructions comprising:
a data structure definition defining a structure for storing representations of events;
a plurality of event monitor processes comprising a first event monitor process and a second event monitor process;
an event capture process configured to:
a) receive a notification from the first event monitor process about a first event of interest;
b) capture the first event of interest for analysis by an event analysis process;
c) capture information about a context of the first event of interest;
d) receive a notification from the second event monitor process about a second event of interest;
e) capture the second event of interest for analysis by an event analysis process; and
f) capture information about a context of the second event of interest;
an event analysis process configured to:
a) determine that the first event of interest should be collected for further analysis;
b) maintain, in a data structure defined by the data structure definition, a representation of the first event;
c) determine that the second event of interest should be collected for further analysis; and
d) maintain, in the data structure defined by the data structure definition, a representation of the second event; and
a data management process configured to store information about the first and second events of interest in an event cache on the non-volatile storage medium.

7. A system for caching events occurring on a monitored computer, the system comprising computer-readable media having logic stored therein, the logic further comprising:
- an event capture process configured to capture a plurality of events of interest, the plurality of events of interest comprising a first event of interest and a second event of interest; and
- a data management process configured to store information about the first and second events of interest in an event cache on a non-volatile storage medium, the event cache comprising:
  - a) an event file stream comprising a representation of the first event and a representation of the second event;
  - b) an event context file stream comprising information about a context of the first event and information about a context of the second event; and
  - c) an event score file stream comprising information about a first score assigned to the first event of interest and information about a second score assigned to the second event of interest.

8. A system as recited by claim 7, wherein:
the representation of the first event comprises a first variable-length data segment; and the representation of the second event comprises a second variable-length data segment.

9. A system as recited by claim 7, wherein:
the information about the context of the first event comprises a first variable-length data segment; and
the information about the context of the second event comprises a second variable-length data segment.

10. A system as recited by claim 7, wherein:
the information about the first score assigned to the first event comprises a first variable-length data segment; and
the information about the second score assigned to the second event comprises a second variable-length data segment.

11. A system as recited by claim 7, wherein the event cache further comprises an end-of-collection file stream identifying the end of a collection comprising the first event of interest and the second event of interest.

12. A system as recited by claim 7, wherein the event cache further comprises a session file stream comprising information about a session in which the events occurred.

13. A system as recited by claim 12, wherein the session file stream comprises a collection container comprising a reference to an end-of-collection file stream identifying the end of a collection comprising the first event of interest and the second event of interest.

14. A system as recited by claim 12, wherein the session file stream comprises a collection container comprising a reference to an event metafile stream, a reference to an event context metafile stream, and a reference to an event score metafile stream.

15. A system as recited by claim 14, wherein the reference to the event metafile stream is a first stream identifier, the reference to the event context metafile stream is a second stream identifier, and the reference to the event score metafile stream is a third stream identifier.

16. A system as recited by claim 7, wherein the event cache further comprises:
- an event metafile stream comprising a reference to the representation of the first event and a reference to the representation of the second event;
- an event context metafile stream comprising a reference to the information about the context of the first event and a reference to the information about the context of the second event; and
- an event score metafile stream comprising a reference to the information about the first score assigned to the first event of interest and a reference to the information about the second score assigned to the second event of interest.

17. A system as recited by claim 16, wherein:
the event metafile stream further comprises a stream identifier for the event file stream;
the event context metafile stream further comprises a stream identifier for the event context file stream; and
the event score metafile stream further comprises a stream identifier for the event score file stream.

18. A system as recited by claim 16, wherein:
the reference to the representation of the first event comprises a first character offset into the event file stream, the first character offset representing a start position of the representation of the first event; and
the reference to the representation of the second event comprises a second character offset into the event file stream, the second character offset representing a start position of the representation of the second event.

19. A system as recited by claim 18, wherein:
the reference to the representation of the first event further comprises a value of a length of the representation of the first event; and
the reference to the representation of the second event further comprises a value of a length of the representation of the second event.

20. A system as recited by claim 18, wherein:
the reference to the representation of the first event is a fixed-length data segment; and the reference to the representation of the second event is a fixed-length data segment.

21. A system as recited by claim 16, wherein:
the reference to the information about the context of the first event comprises a first character offset into the event context file stream, the first character offset representing a start position of the information about the context of the first event; and
the reference to the information about the context of the second event comprises a second character offset into the event context file stream, the second character offset representing a start position of the information about the context of the second event.

22. A system as recited by claim 21, wherein:
the reference to the information about the context of the first event further comprises a value of a length of the information about the context of the first event; and
the reference to the information about the context of the second event further comprises a value of a length of the of the information about the context of the second event.

23. A system as recited by claim 21, wherein:
the reference to the information about the context of the first event is a fixed-length data segment; and
the reference to the information about the context of the second event is a fixed-length data segment.

24. A system as recited by claim 21, wherein:
the reference to the information about the first score assigned to the first event is a fixed-length data segment; and
the reference to the information about the second score assigned to the second event is a fixed-length data segment.

25. A system as recited by claim 16, wherein:
the reference to the information about the first score of the first event comprises a first character offset into the event score file stream, the first character offset representing a start position of the information about the score assigned to the first event; and the reference to the information about the second score of the second event comprises a second character offset into the event score file stream, the second character offset representing a start position of the information about the score assigned to the second event.

26. A system as recited by claim 25, wherein:

the reference to the information about the first score assigned to the first event further comprises a value of a length of the information about the score assigned to the first event; and the reference to the information about the second score assigned to the second event further comprises a value of a length of the of the information about the score assigned to the second event.

27. A system as recited by claim 16, wherein the representation of the first event comprises a first variable-length data segment, and wherein the representation of the second event comprises a second-variable-length data segment.

28. A system as recited by claim 16, wherein the information about the context of the first event comprises a first variable-length data segment, and wherein the information about the context of the second event comprises a second-variable-length data segment.

29. A system as recited by claim 16, wherein the information about the first score assigned to the first event comprises a first variable-length data segment, and wherein the information about the second score assigned to the second event comprises a second-variable-length data segment.

30. A system as recited by claim 7, wherein the first event occurs in a first application and wherein the second event occurs in a second application.

31. A system as recited by claim 30, wherein the first application runs in a first thread of execution, wherein the application runs in a second thread of execution, and wherein the event capture process runs in a third thread of execution separate from the first and second threads of execution.

32. A system as recited by claim 7, wherein the first event of interest and the second event of interest are each selected from the group consisting of:

a use of an encrypted protocol,
a use of encrypted content,
a transmission of an electronic mail message,
a receipt of an electronic mail message,
an attachment of a file to an electronic mail message,
an attachment of an encrypted file to an electronic mail message,
a load of an HTML page in a web browser,
an unload of an HTML page in a web browser,
a web browser request for a URL,
a load of an image in a web browser,
a load of a script in a web browser,
a file download,
an HTML form reset,
an HTML form submit,
an HTML form text field input,
an HTML form personal information file input,
an HTML radio button selected,
an HTML check box selected,
an HTML check box unselected,
a selection from an HTML selection list,
a transmission of an instant messenger message,
a receipt of an instant messenger message,
a creation of a file by an office application,
a read of a file by an office application,
a write to a file by an office application,
a creation of a print job,
a copy of data to a clipboard,
an entry of one or more keystrokes by a user,
an input from a mouse attached to the monitored computer,
a movement of a cursor over an HTML elements on a display,
a drive mount operation,
a drive dismount operation,
an unsuccessful attempt to mount a drive,
a file create operation,
a file copy operation,
a file move operation,
a file delete operation,
a file read operation,
a file rename operation,
a file write operation, and
data satisfying one or more configured regular expressions.

33. A method of caching events occurring on a monitored computer, the method comprising:

capturing a plurality of events of interest, the plurality of events of interest comprising a first event of interest and a second event of interest; and storing information about the first and second events of interest in an event cache on a non-volatile storage medium, the event cache comprising:

an event file stream comprising a representation of the first event and a representation of the second event;

an event context file stream comprising information about a context of the first event and information about a context of the second event;

an event score file stream comprising information about a score assigned to the first event of interest and information about a score assigned to the second event of interest; and a session file stream comprising information about a session in which the first event and the second event occurred.

34. A method for storing representations of monitored events on a monitored computer, the method comprising:

defining a data structure for storing representations of events;

monitoring a plurality of events occurring on the monitored computer;

capturing a first event of interest;

capturing a second event of interest;

determine that the first event of interest should be collected for further analysis;

maintain, in a data structure defined by the data structure definition, a representation of the first event;

determine that the second event of interest should be collected for further analysis; and maintain, in the data structure defined by the data structure definition, a representation of the second event; and storing information about the first and second events of interest in an event cache on the non-volatile storage medium.

35. Computer-readable media having logic stored therein, the logic operable, when executed on a processor, to:

execute an event capture process configured to capture a plurality of events of interest occurring on a monitored computer, the plurality of events of interest comprising a first event of interest and a second event of interest; and execute a data management process configured to store information about the first and second events of interest in an event cache on a non-volatile storage medium, the event cache comprising:

a) an event file stream comprising a representation of the first event and a representation of the second event;

b) an event context file stream comprising information about a context of the first event and information about a context of the second event;

c) an event score file stream comprising information about the score assigned to the first event of interest and information about the score assigned to the second event of interest; and d) a session file stream comprising information about the session.

36. The logic of claim 35, wherein the logic is configured to operate on the monitored computer.

37. The logic of claim 36, wherein the logic is configured to operate without detection by a user of the monitored computer.

* * * * *